(12) United States Patent
Yamaguchi et al.

(10) Patent No.: US 7,852,439 B2
(45) Date of Patent: Dec. 14, 2010

(54) MULTI-LAYER DISPLAY ELEMENT AND MANUFACTURING METHOD FOR THE SAME

(75) Inventors: Hisashi Yamaguchi, Atsugi (JP); Fumio Yamagishi, Ebina (JP); Shigeo Matsunuma, Kawasaki (JP); Nobuhiro Imaizumi, Kawasaki (JP); Yoshikatsu Ishizuki, Kawasaki (JP); Taiji Sakai, Kawasaki (JP); Junji Tomita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/561,613

(22) Filed: Sep. 17, 2009

(65) Prior Publication Data
US 2010/0097550 A1    Apr. 22, 2010

Related U.S. Application Data

(63) Continuation of application No. PCT/JP2007/055562, filed on Mar. 19, 2007.

(51) Int. Cl.
*G02F 1/1335* (2006.01)

(52) U.S. Cl. .................. 349/115; 349/56; 349/84; 349/113

(58) Field of Classification Search ............ 349/56, 349/84, 113, 115
See application file for complete search history.

(56) References Cited

U.S. PATENT DOCUMENTS

| | | | |
|---|---|---|---|
| 7,679,815 B2 * | 3/2010 | Kobayashi et al. ........ | 359/296 |
| 2001/0038427 A1 | 11/2001 | Ueda et al. | |
| 2001/0046008 A1 | 11/2001 | Ueda et al. | |
| 2003/0030376 A1 * | 2/2003 | Aoki et al. ................. | 313/582 |
| 2005/0258531 A1 | 11/2005 | Ishii | |
| 2008/0068553 A1 | 3/2008 | Tomita et al. | |

FOREIGN PATENT DOCUMENTS

| | | | |
|---|---|---|---|
| JP | 5-21508 A | | 1/1993 |
| JP | 10-228028 A | | 8/1998 |
| JP | 10-253981 A | | 9/1998 |
| JP | 2001-282146 A | | 10/2001 |

(Continued)

OTHER PUBLICATIONS

International Search Report of PCT/JP2007/055562, mailing date of Apr. 17, 2007.

*Primary Examiner*—Jennifer Doan
(74) *Attorney, Agent, or Firm*—Westerman, Hattori, Daniels & Adrian, LLP

(57) ABSTRACT

The invention relates to a multi-layer display element configured by a plurality of layers for use as a display section of electronic paper or others, and a manufacturing method for the multi-layer display element. The invention provides a multi-layer display element that allows a pixel area not being narrowed, a high yield of electrode formation, and interlayer connection with no need for a high-temperature process, and a manufacturing method for such a multi-layer display element. The multi-layer liquid crystal display element includes a data signal output terminal group from which data signals are provided, a scanning signal output terminal group from which scanning signals are provided, a data electrode connection wire rod group respectively connecting data electrodes to the data signal output terminal group, and a scanning electrode connection wire rod group respectively connecting scanning electrodes to the scanning signal output terminal group.

20 Claims, 21 Drawing Sheets

FOREIGN PATENT DOCUMENTS

| | | |
|---|---|---|
| JP | 2001-306000 A | 11/2001 |
| JP | 2003-224242 A | 8/2003 |
| JP | 2005-332973 A | 12/2005 |
| JP | 2006-332342 A | 12/2006 |
| WO | 2006/100713 A1 | 9/2006 |

* cited by examiner

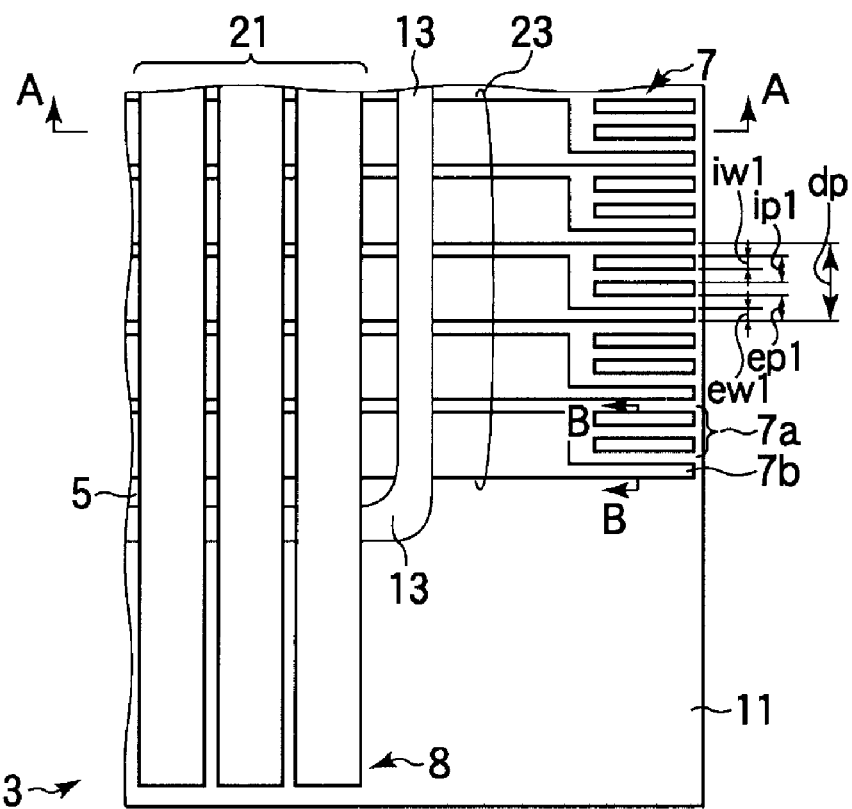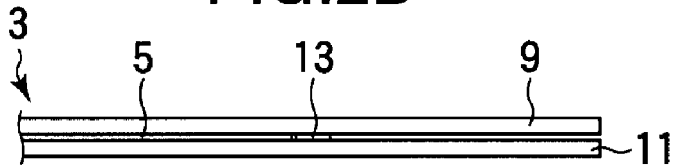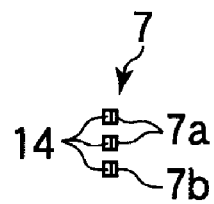

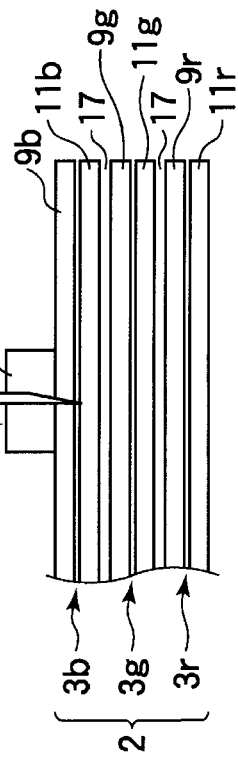
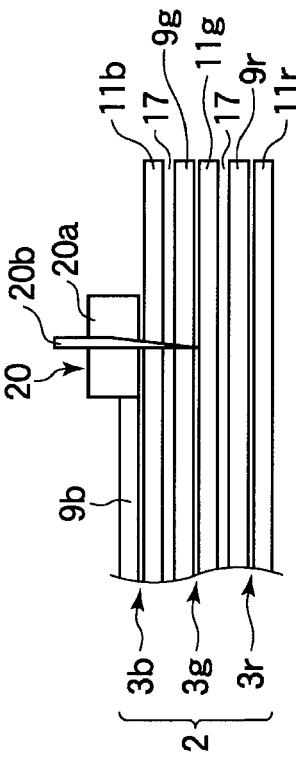
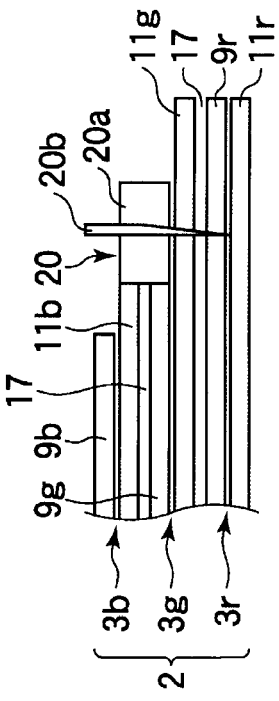
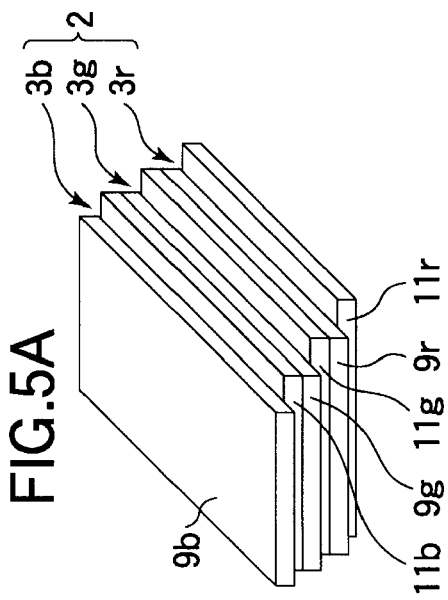

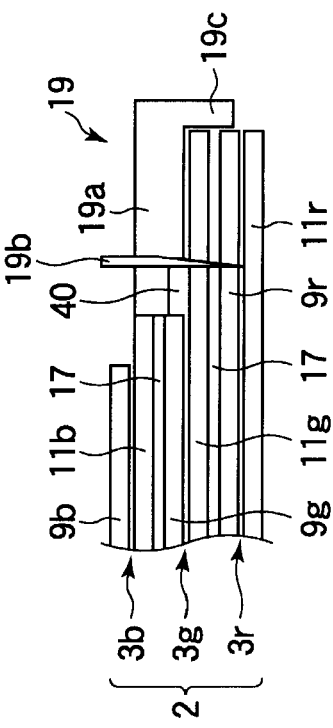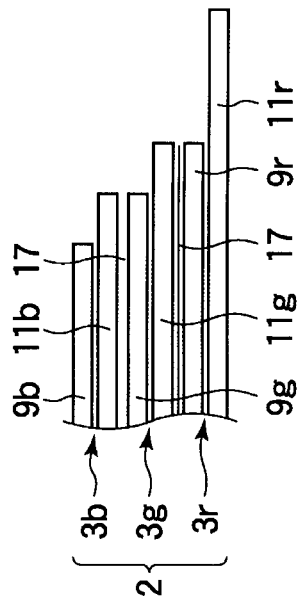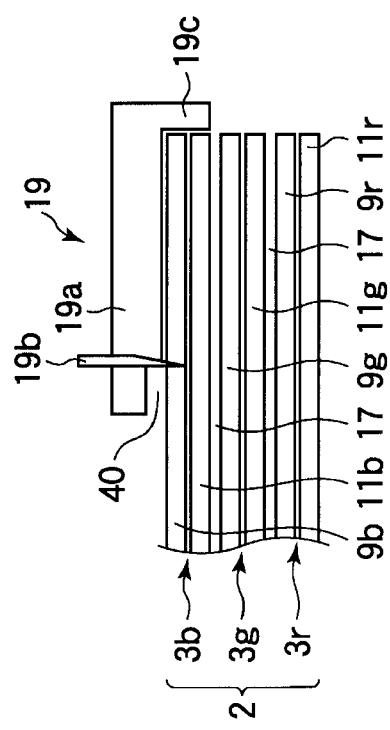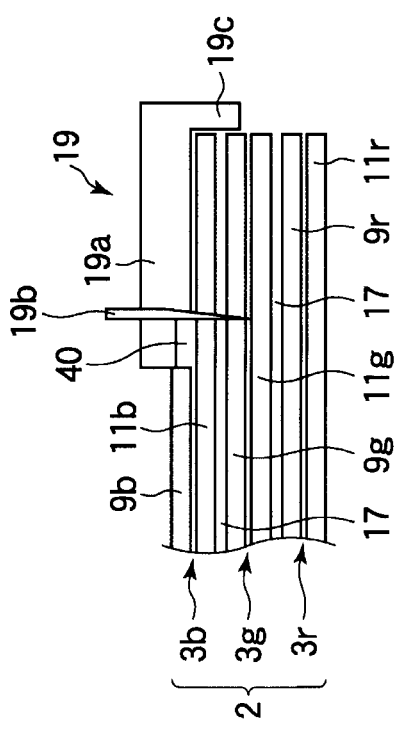

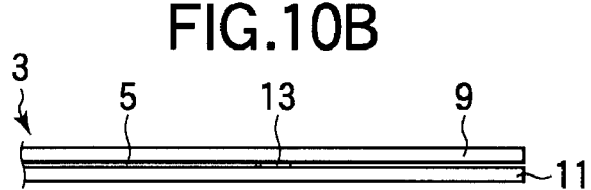
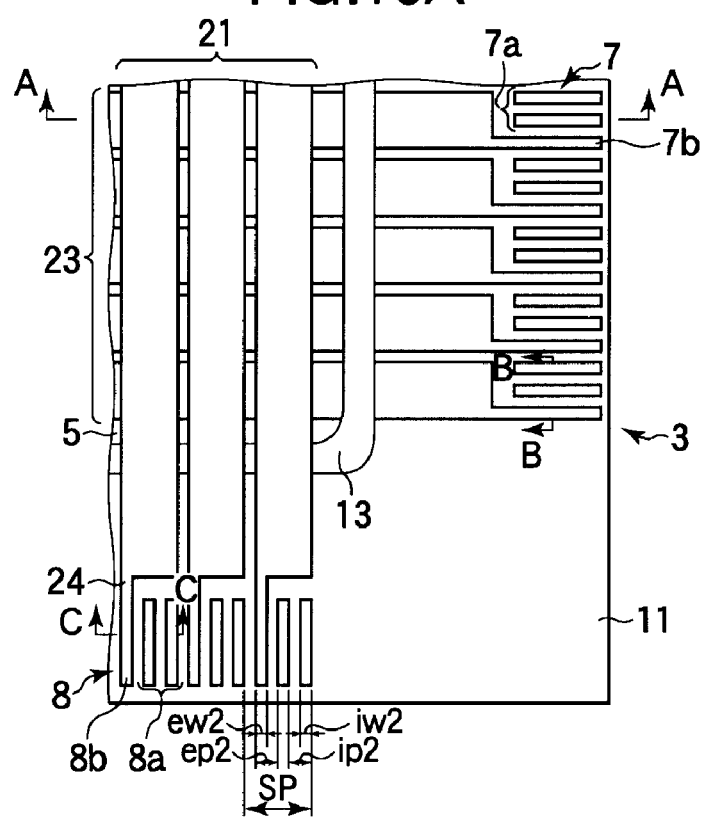
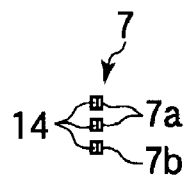
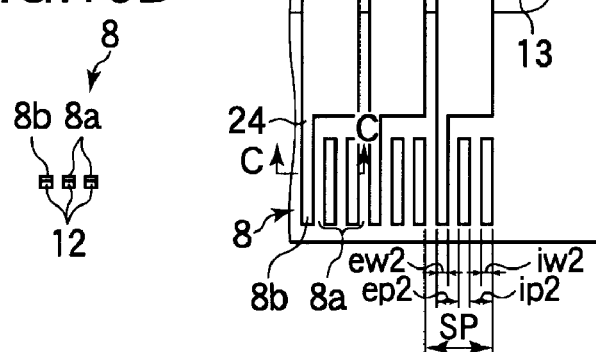

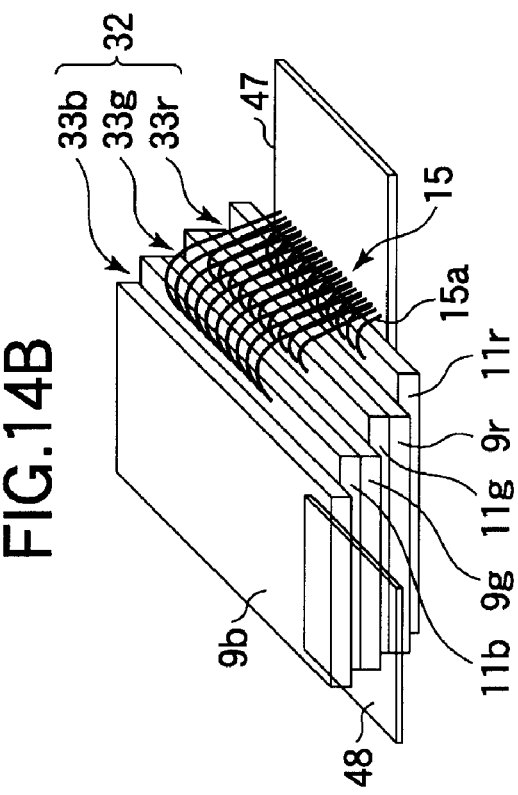
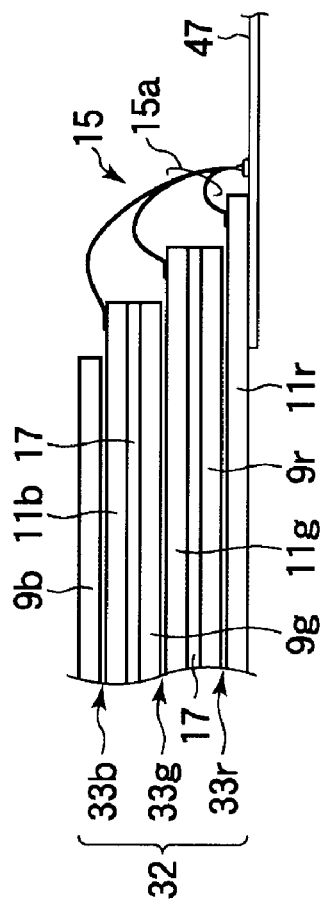
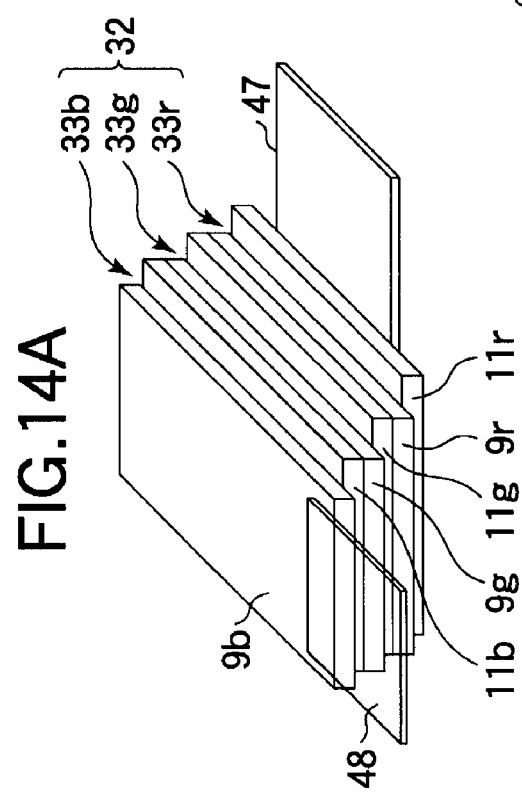

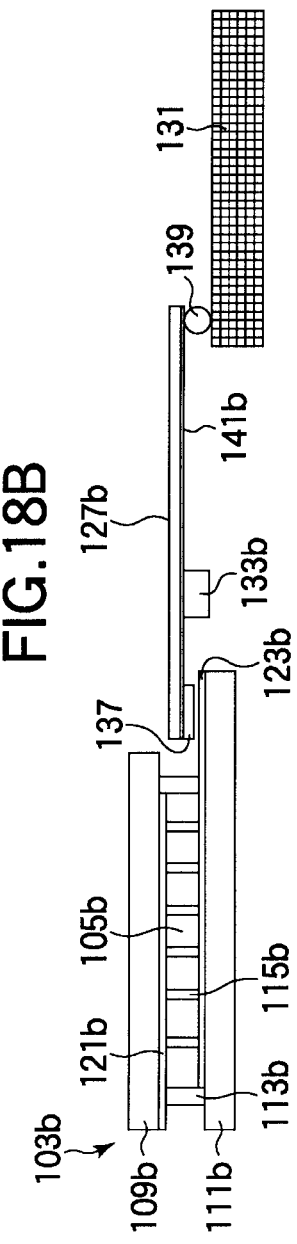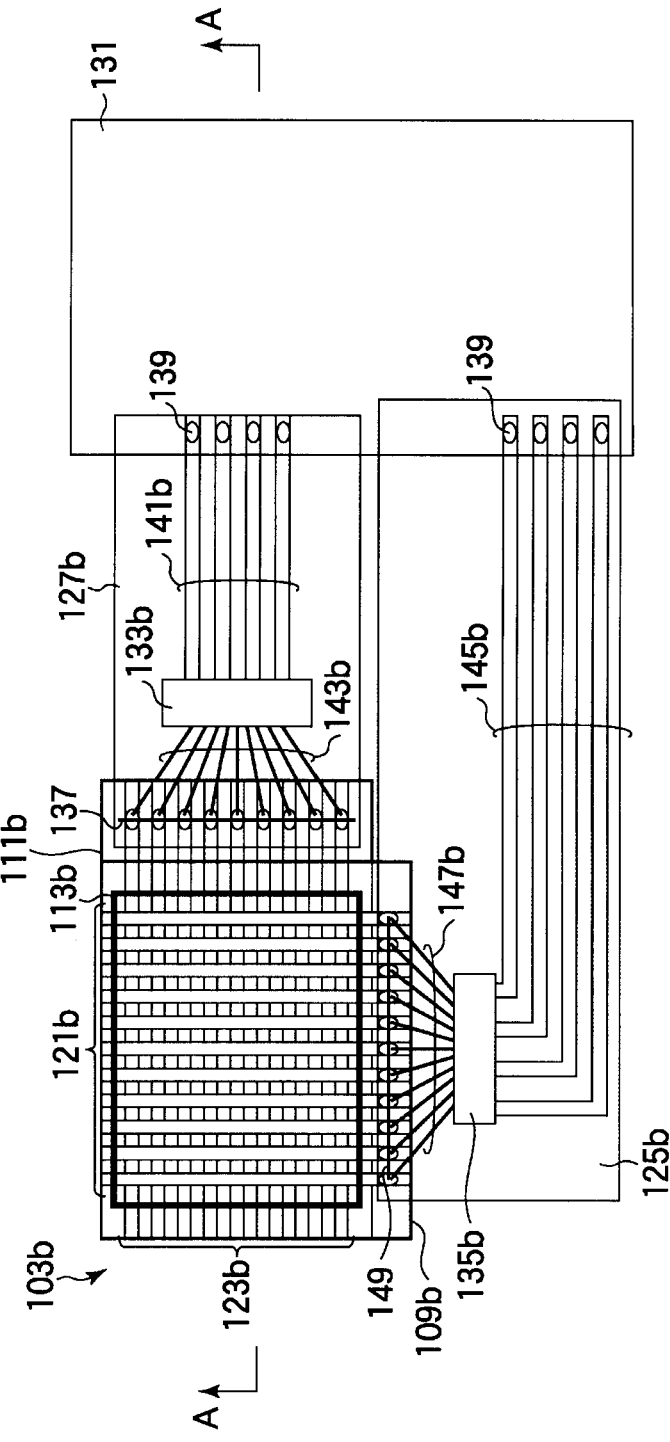

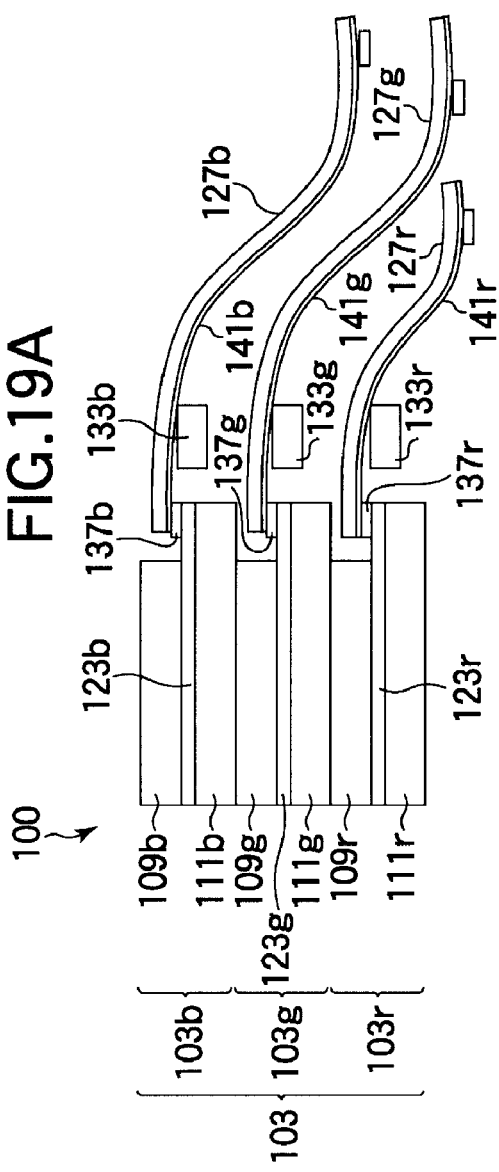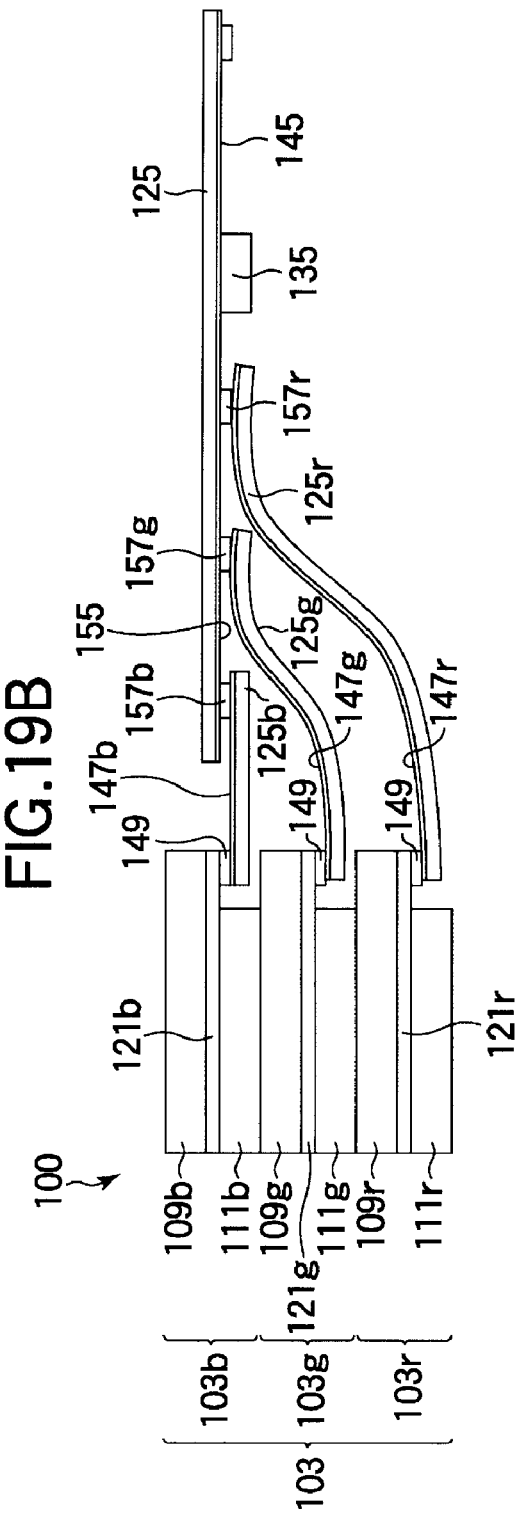

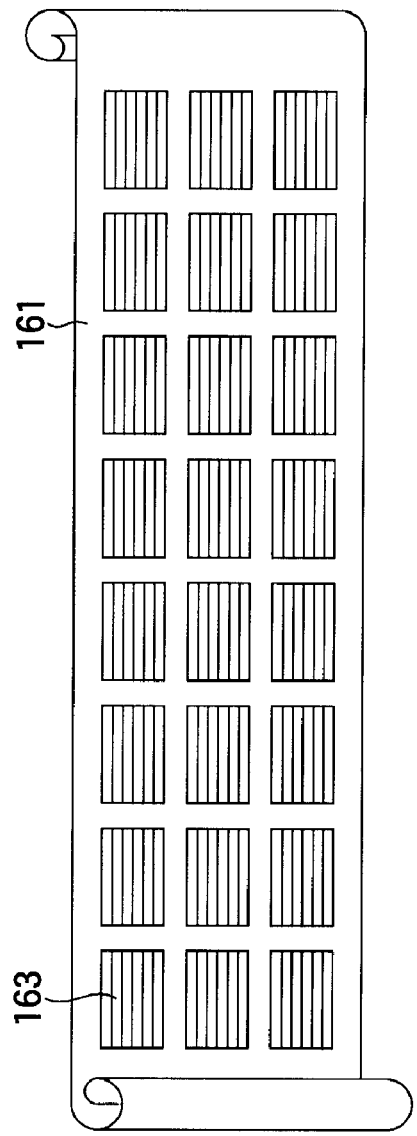
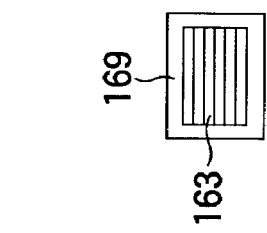
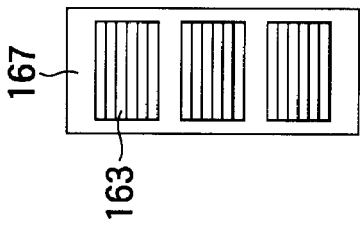
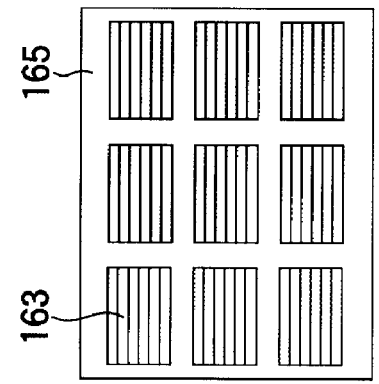

MULTI-LAYER DISPLAY ELEMENT AND MANUFACTURING METHOD FOR THE SAME

This application is a continuation of International Application No. PCT/JP2007/055562, filed Mar. 19, 2007.

FIELD

The present invention relates to a multi-layer display element configured by a plurality of layers for use as a display section of electronic paper or others, and a manufacturing method for the multi-layer display element.

BACKGROUND

Electronic paper is expected to become rapidly popular for use from this time forward. The electronic paper is capable of storing display images even with no power supply, and electrically rewriting display contents. The electronic paper has been under study for implementing a super-low power consumption allowing memory display even if power is turned off, reflective display easy on eyes, and a flexible low-profile display body being flexible like paper. Such electronic paper is considered a possible option for use as a display section of electronic book, electronic newspaper, electronic poster, and others.

The electronic paper is applicable to various display modes including an electrophoresis mode, a twist-ball mode, an organic EL (electroluminescence) display mode, a liquid crystal display mode, and others. The electrophoresis mode is to move electrically-charged particles in the air or in a liquid. The twist-ball mode is to rotate electrically-charged particles colored in two colors. The organic EL display mode is of the self-luminous type with a plurality of organic thin films sandwiched by a cathode and an anode. The liquid crystal display mode is of the no-self-luminous type with a liquid crystal layer sandwiched between a pixel electrode and an opposing electrode.

The research and development for the electronic paper in the liquid crystal display mode has been conducted using a cholesteric liquid crystal material, which is with the selective reflection featuring the bistability utilizing interference reflection of the liquid crystal layer. Herein, the bistability denotes properties with which the liquid crystal material depicts the stability in two different states of orientation. The cholesteric liquid crystal material has properties of being able to remain in two stable states of planer and focal conic for a long time even after the removal of electric field. With the cholesteric liquid crystal material as such, an incident light is interference-reflected thereby in the planer state, and the incident light passes therethrough in the focal conic state. With such properties, a liquid crystal display panel whose liquid crystal layer is made of the cholesteric liquid crystal material can display the contrast of light by selectively reflecting the incident light in the liquid crystal layer, thereby not requiring a polarizing plate any more. Note here that the cholesteric material is also called chiral nematic liquid crystal material.

The liquid crystal display mode using such a cholesteric liquid crystal material (hereinafter, referred to as "cholesteric liquid crystal mode" for convenience) is extremely advantageous in view of color display of liquid crystal display elements. The cholesteric liquid crystal mode utilizes the interference of the liquid crystal material to reflect lights of any predetermined color. This thus enables color display in the cholesteric liquid crystal mode only by laminating liquid crystal display panels reflecting lights of various colors. As such, the cholesteric liquid crystal mode is completely outperforming the other modes described above, i.e., electrophoresis mode and others, in view of color display. For color display, the remaining other modes are all required to use a color filter colored in three colors on a pixel basis, and thus the lightness of color in these modes is about ⅓ of that in the cholesteric liquid crystal mode. In consideration thereof, for such remaining other modes, increasing the lightness is a high hurdle to implement the electronic paper.

As described above, the cholesteric liquid crystal mode is considered a promising mode for the electronic paper capable of color display. The concern here is that, however, for implementing color display, the cholesteric liquid crystal mode is with a three-layered liquid crystal display panel for display of images of red (R), green (G), and blue (B). Such a three-layered liquid crystal display panel is configured by laminating three pieces of liquid crystal display panels, and with such a configuration of laminating three pieces of liquid crystal display panels, the cholesteric liquid crystal mode thus has to overcome the problems such as the large number of components, the complexity of manufacturing process, and the reliability of panel lamination.

FIG. 17 is a schematic diagram illustrating the cross-sectional configuration of a previous color-display cholesteric liquid crystal display element 100. In FIG. 17, for easy understanding, scanning electrode substrates 109b, 109g, and 109r are depicted with 90-degree rotation. FIGS. 18A and 18B each depict an exemplary connection state between a B-use liquid crystal display panel 103b and a display control circuit substrate 131. The B-use liquid crystal display panel 103b here is the one provided to the liquid crystal display element 100 of FIG. 17 together with other R- and G-use liquid crystal display panels 103r and 103g. Specifically, FIG. 18A depicts the B-use liquid crystal display panel 103b viewed from the display surface side, and FIG. 18B depicts the cross section of the B-use liquid crystal display panel 103b cut along a line A-A of FIG. 18A.

As depicted in FIG. 17, the liquid crystal display element 100 is of a configuration including three single-color display panels laminated together, i.e., B-, G-, and R-use liquid crystal display panels 103b, 103g, and 103r, and a black no-light-transmission layer 119 on the rear surface of the R-use liquid crystal display panel 103r. The B- and G-use liquid crystal display panels 103b and 103g are fixedly laminated together by an adhesive layer 117, and the G- and R-use liquid crystal display panels 103g and 103r are fixedly laminated together by another adhesive layer 117.

As depicted in FIGS. 17, 18A and 18B, the B-use liquid crystal display panel 103b is configured to include a scanning electrode substrate 109b, a data electrode substrate 111b, and a cholesteric liquid crystal layer, i.e., the B-use liquid crystal layer 105b. The scanning electrode substrate 109b includes a plurality of scanning electrodes 121b, and the data electrode substrate 111b includes a plurality of data electrodes 123b. The cholesteric liquid crystal layer has a function of wavelength selective reflection, and is sealed between the substrates 109b and 111b with a thickness of several μm. The substrates 109b and 111b are each made of glass or film. When the substrates 109b and 111b are each made of flexible film, the flexibility may change the thickness of the B-use liquid crystal layer 105b, thereby possibly deteriorating the display quality. In order to prevent such deterioration of the display quality due to the substrates 109b and 111b being flexible, the B-use liquid crystal display panel 103b is provided with a plurality of wall structure bodies 115b that are formed adhesive between the substrates 109b and 111b. Such wall structure bodies are described in Patent Document 1 (pamphlet of WO06/100713), for example.

The scanning electrodes 121b and the data electrodes 123b are each extended and exposed, i.e., one end portion thereof, to the outside of a liquid crystal sealing layer, thereby serving as an external connection terminal. The liquid crystal sealing layer here is a display area enclosed by a sealing material 113b. Generally, the external connection terminals of the scanning electrodes 121b are respectively connected to connection terminals (not depicted) of an FPC (Flexible Printed Substrate) 125b via an ACF (Anisotropic Conductive Film) 149. The FPC 125b is mounted with a liquid-crystal drive IC (Integrated Circuit) 135b for driving the scanning electrodes. From the liquid-crystal drive IC 135b toward the connection terminals of the FPC 125b, leads 147b are wired as many as the scanning electrodes 121b.

The external connection terminals of the data electrodes 123b are respectively connected to connection terminals of an FPC 127b via an ACF 137. The FPC 127b is mounted with a liquid-crystal drive IC 133b for driving the data electrodes. From the liquid-crystal drive IC 133b toward the connection terminals of the FPC 127b, leads 143b are wired as many as the data electrodes 123b. The B-use liquid crystal display panel 103b is connected to the outside generally at two portions of the scanning electrodes 121b and the data electrodes 123b.

The liquid-crystal drive IC 135b mounted on the FPC 125b is connected to an input signal line 145b including power-supply wiring, data wiring, and clock-signal wiring, for example. The input signal line 145b is connected to, using a solder material 139, an external terminal on the display control circuit substrate 131 carrying thereon a control IC, and a power supply circuit (both not depicted), for example. The liquid-crystal drive IC 133b provided on the FPC 127b is connected to an input signal line 141b including power-supply wiring, data wiring, and clock-signal wiring, for example. The input signal line 141b is connected to, using the solder material 139, an external terminal on the display control circuit substrate 131. The solder material 139 is surely not restrictive, and a socket may be alternatively used for connection of the FPCs 125b and 127b as such.

In FIG. 17, the G- and R-use liquid crystal display panels 103g and 103r are each in the configuration same as that of the B-use liquid crystal display panel 103b, and are each connected to the display control circuit substrate 131.

FIGS. 19A and 19B are each a schematic diagram illustrating the cross section of the liquid crystal display panel 103 connected with an FPC. For implementing color display, as depicted in FIG. 17, there needs to laminate together the R-, G-, and B-use liquid crystal display panels 103r, 103g, and 103b. As depicted in FIG. 19A, in a previous general technology (hereinafter, referred to as "first previous technology"), the R-, G-, and B-use liquid crystal display panels 103r, 103g, and 103b are respectively provided with data electrodes 123r, 123g, and 123b, which are connected to FPCs 127r, 127g, and 127b via ACFs 137r, 137g, and 137b, respectively. The FPCs 127r, 127g, and 127b here are those respectively carrying thereon liquid-crystal drive ICs 133r, 133g, and 133b. Also in the first previous technology, as depicted in FIG. 19B, the R-, G-, and B-use liquid crystal display panels 103r, 103g, and 103b are respectively provided with scanning electrodes 121r, 121g, and 121b, which are connected to FPCs 125r, 125g, and 125b via ACFs 149r, 149g, and 149b, respectively. The FPCs 125r, 125g, and 125b here are those carrying no liquid-crystal drive IC. The liquid crystal display element 100 is configured first by respectively connecting the FPCs 127r, 127g, and 127b, and the FPCs 125r, 125g, and 125b to the R-, G-, and B-use liquid crystal display panels 103r, 103g, and 103b, and then laminating the resulting three panels together. Thereafter, as depicted in FIG. 19B, the FPCs 125r, 125b, and 125g are respectively connected to, via ACFs 157r, 157g, and 157b, to a wiring pattern 155 formed to the FPCs 125 provided with the liquid-crystal drive ICs 135. The FPCs 125r, 125g, and 125b for the scanning electrodes and the FPCs 127r, 127g, and 127b for the data electrodes are each connected to the display control circuit substrate 131 (refer to FIGS. 18A and 18B) provided thereon with a control circuit, and others.

The liquid crystal display element 100 is a small-sized display element with which the R-, G-, and B-use liquid crystal display panels 103r, 103g, and 103b can be driven only by the liquid-crystal drive ICs 133r, 133g, and 133b, respectively. However, although being small in size, the liquid crystal display element 100 has to establish therein nine connections in total before and after the panel lamination, i.e., six connections between the R-, G-, and B-use liquid crystal display panels 103r, 103g, and 103b to the FPCs 125r, 125g, 125b, 127r, 127g, and 127b, and three connections between the FPCs 125r, 125g, and 125b to the FPC 125. What is more, the liquid crystal display element 100 needs seven FPCs, and four liquid-crystal drive ICs, i.e., requires a large number of components. If the liquid crystal display element becomes large in size, a plurality of drive ICs are additionally required for driving the R-, G-, and B-use liquid crystal display panels, and this means the additional increase of the number of connections between the liquid crystal display panels and the FPCs. With such an additional increase of the number of connections, the resulting liquid crystal display element is reduced in reliability. The concern here is that, in the multi-layer liquid crystal display element, the configuration with a fewer number of FPCs is not yet implemented. As such, because no such configuration with a fewer number of connections is yet realized, the multi-layer liquid crystal display element costs a lot for the material and in terms of man-hours, and the reliability thereof is also reduced.

FIG. 20 is a flowchart of a general manufacturing process of a previous multi-layer liquid crystal display element using a film substrate. FIGS. 21A to 21D are schematic diagrams illustrating how such a previous multi-layer liquid crystal display element using a film substrate is manufactured. Specifically, FIG. 21A is a diagram for illustrating the manufacturing process of step S1 of FIG. 20, and FIGS. 21B to 21D are the diagrams for illustrating the manufacturing processes of steps S2 to S11 of FIG. 20.

As depicted in FIGS. 20 and 21A, a roll-like upper film substrate 161 is formed thereon with a transparent conductor like a stripe extending in the longitudinal direction of the upper film substrate 161 so that upper substrate electrodes 163 are formed (step S1). The upper substrate electrode 163 is formed with a plurality of electrode patterns on the upper film substrate 161. Also a roll-like lower film substrate (not depicted) is formed thereon with a transparent conductor like a stripe extending in the latitudinal direction of the lower film substrate so that lower substrate electrodes are formed (step S2). The upper substrate electrodes 163 are so disposed as to intersect with the lower substrate electrodes when the upper film substrate 161 is laminated together with the lower film substrate.

Next, in accordance with the final dimension of the liquid crystal display panels, and the number of panels to be needed, the upper film substrate 161 is cut to the size of a sheet-like substrate 165 of FIG. 21B, a strip-like substrate 167 of FIG. 21C, or a small-piece substrate 169 of FIG. 21D (step S3). Thereafter, to an area formed with the upper substrate electrodes 163, a column-like spacer is formed with a thickness of several microns for making uniform the thickness of liquid crystal display cells (step S4). The lower film substrate is then cut to any of the sizes of the sheet-like substrate, the strip-like substrate, and the small-piece substrate of FIGS. 21B to 21D (step S5). When the upper film substrate 161 is cut to the size of the sheet-like substrate 163, for example, the lower film substrate is accordingly cut to the size of the sheet-like substrate (step S5). As such, the lower film substrate is cut to the same size as the upper film substrate 161. Next, to the area formed with the lower substrate electrodes, spherical spacers are dispersed to keep uniform the thickness of the liquid crystal display cells (step S6). A sealing material (not depicted) is then formed to enclose the area formed with the upper substrate electrodes 163 for sealing the liquid crystal material therein (step S7). Alternatively, the sealing material may be formed to enclose the lower substrate electrodes. The upper and lower substrates are then attached together in the state that the upper and lower substrate electrodes are being intersected with each other, and the column-like spacer and the sealing material are being sandwiched between the substrates. After the attaching of the substrates as such, empty cells are formed (step S8).

From an injection port of each of the empty cells, an R-use liquid crystal material is injected by vacuum injection, for example, for selectively reflecting lights of red (step S9). After the completion of the injection of the R-use liquid crystal material, the injection ports are sealed by an end sealing agent (step S10). When the upper and lower film substrates are both cut into the size of the sheet- or strip-like substrate in steps S3 and S5, the resulting substrate structure is cut to the size of the small-piece substrate of FIG. 21D (step S11). In step S11, the upper substrate electrodes 163 are exposed from the cut end portion of the upper substrate, and the lower substrate electrodes are exposed from the cut end portion of the lower substrate. The concern here is that, because the liquid crystal layer is with the thickness of several microns, it is difficult to cut the upper and lower substrates without damaging the upper substrate electrodes 163 and the lower substrate electrodes. In consideration thereof, the upper and lower substrates may be provided with a cut or formed with an aperture in advance, or the upper and lower film substrates may be cut in advance to the size of not the sheet- and stripe-like substrates of FIGS. 21B and 21C but the size of the small-piece substrate of FIG. 21D. Thereafter, with the exposed portions of the upper substrate electrodes 163 and those of the lower substrate electrodes serving each as a connection terminal, the FPCs are connected thereto using the ACF so that the R-use liquid crystal display panel (single-color panel R) is completed (steps S12 and S13). Note here that the FPCs may be each provided thereon with a liquid-crystal drive IC or may not.

For manufacturing a liquid crystal display element capable of color display, with the manufacturing process similar to those of steps S1 to S13, a G-use liquid crystal display panel (single-color panel G) is formed with an FPC connected thereto (step S14). In step S14, a G-use liquid crystal material is used for selectively reflecting lights of green. Thereafter, with the manufacturing processes similar to those of steps S1 to S13, a B-use liquid crystal display panel (single-color panel B) is formed with an FPC connected thereto (step S15). In step S15, a B-use liquid crystal material is used for selectively reflecting lights of blue.

Based on an alignment mark formed to each of the R-, G-, and B-use liquid crystal display panels, these liquid crystal display panels are positioned for matching of the panels, i.e., the layers, and are laminated together using a photocurable adhesive agent, for example (step S16). In step S16, for example, the R- and G-use liquid crystal display panels are laminated together, and then the B-use liquid crystal display panel is laminated on the G-use liquid crystal display panel. In step S16, as an alternative to the photocurable adhesive agent, an adhesive film, may be used. After the completion of the lamination of the R-, G-, and B-use liquid crystal display panels as such, as depicted in FIG. 19A, the lower substrate electrodes, i.e., the data electrodes, of the R-, G-, and B-use liquid crystal display panels are connected to the display control circuit substrate 131 (refer to FIGS. 18A and 18B) via the respective FPCs using a solder material (step S17). Then in step S17, as depicted in FIG. 19B, the upper substrate electrodes, i.e., scanning electrodes, of the R-, G-, and B-use liquid crystal display panels are connected to a relay substrate via the respective ACFs, and then the relay substrate is soldered to the display control circuit substrate 131 (refer to FIGS. 18A and 18B). The relay substrate here is the one provided thereon with the liquid-crystal drive ICs 135 (scanning drive ICs). By going through such a manufacturing process, completed is a multi-layer liquid crystal display element capable of color display with a narrow frame (step S18).

With the manufacturing processes for the previous multi-layer liquid crystal display element of FIG. 20, not to cover the exposed portions of the upper- and lower-substrate electrodes, the liquid crystal display panels are connected to, before being laminated together, the FPCs by ACF-terminal junction, and then the three liquid crystal display panels are laminated together. After the completion of the lamination as such, the FPCs are connected to the display control circuit substrate or to the relay substrate by ACF-terminal junction. As such, the manufacturing processes for the previous multi-layer liquid crystal display element have the problem of repeating the process of ACF-terminal junction. What is more, the FPC-connected liquid crystal display panels are difficult to handle, and often cause product failure such as lamination misalignment, adhesive stain, and poor junction at FPC-terminal-junction portions, and others. Also with the manufacturing processes described above, the liquid crystal display panels are laminated together after being respectively connected to the FPCs, and thus multiple production with such a lamination process is not possible. On the other hand, in the manufacturing processes for the previous liquid crystal display element, because a failure check is performed at the manufacturing stage of the single-color liquid crystal display panels, there are advantages of achieving the product yields being generally high, and implementing a narrower frame for the resulting liquid crystal display panels.

Patent Document 2 (JP-A-2001-306000) describes a method for preventing repetition of process execution, i.e., display panels are first stacked together, and then are connected all at once. With the method described in Patent Document 2 (hereinafter, referred to as "second previous technology"), a height-different exposed portion is provided to the laminate of the display panels at their connection portions, and after the lamination of the display panels as such, the FPCs are respectively connected to the display panels. Such a method requires, however, a crimp area to each of the panel layers with a width of about several millimeters for securing the reliability of the ACF-connection. This thus arises a problem of substantially increasing the frame area that has nothing to do with display. What is more, because the three types of R-, G-, and B-use display panels are different in size, there is another problem of a difficulty in so-called multiple production with a plurality of panels aligned. As such, there has been a demand for the configuration and method allowing a narrow frame of a display panel, an FPC-wiring connection after display panel lamination, a fewer number of components and connection points, and lamination leading to multiple production.

SUMMARY

According to aspects of embodiments, a multi-layer display element, includes a first display panel including a first data electrode substrate formed with a first data electrode, and a first scanning electrode substrate formed with a first scanning electrode disposed to intersect with the first data electrode, and is disposed to oppose the first data electrode substrate so as to expose an end portion of the first data electrode and an end portion of the first scanning electrode, a second display panel laminated to the first display panel, including a second data electrode substrate formed with a second data electrode, and a second scanning electrode substrate formed with a second scanning electrode disposed to intersect with the second data electrode, and is disposed to oppose the second data electrode substrate so as to expose an end portion of the second data electrode and an end portion of the second scanning electrode, a data signal output terminal group that provides a data signal for driving the first and second data electrodes, a scanning signal output terminal group that provides a scanning signal for driving the first and second scanning electrodes, a data electrode connection wire rod group including a plurality of conductive wire rods for connecting together the first and second data electrodes and the data signal output terminal group, and a scanning electrode connection wire rod group including a plurality of conductive wire rods for connecting together the first and second scanning electrodes and the scanning signal output terminal group.

BRIEF DESCRIPTION OF THE DRAWINGS

FIGS. 2A to 2C are each an enlarged view of the liquid crystal display panel 3 for use with the multi-layer liquid crystal display element 1 in the first embodiment;

FIGS. 5A to 5D are diagrams for illustrating a terminal exposing process in the manufacturing method for the multi-layer liquid crystal display element 1 in the first embodiment;

FIGS. 8A to 8D are still other diagrams for illustrating the terminal exposing process in the manufacturing method for the multi-layer liquid crystal display element 1 in the first embodiment;

FIGS. 10A to 10D are each an enlarged view of the liquid crystal display panel 3 for use with the multi-layer liquid crystal display element 1 in the modified example of the first embodiment;

FIGS. 14A to 14C are diagrams for illustrating a manufacturing method for the multi-layer liquid crystal display element 31 in the second embodiment;

FIGS. 18A and 18B are each a diagram showing a state of connection between a previous liquid crystal display panel and a display control circuit substrate;

FIGS. 19A and 19B are each a schematic diagram showing the cross section of the previous liquid crystal display element 100;

FIGS. 21A to 21D are schematic diagrams illustrating the manufacturing method for the previous multi-layer liquid crystal display element using a film substrate.

DESCRIPTION OF THE PREFERRED EMBODIMENTS

In first and second embodiments, described is a new technique for solving the above-described problems of the previous multi-layer display element in terms of the assembly configuration and the manufacturing method therefor. Objects of the first and second embodiments are summarized as Objects 1 to 6 as follows:

Object 1. To reduce the number of components, especially the number of FPCs and drive ICs, in a multilayer configuration including a plurality of film display panels.

Object 2. To provide a configuration and a manufacturing method that allow substrate-to-substrate wiring and connection and wiring of external circuits after a plurality of display panels are laminated together.

Object 3. To provide a multi-layer display element with a fewer number of wiring connection points.

Object 4. To provide a multi-layer display element whose frame area is narrow.

Object 5. To provide a configuration and a manufacturing method that allow multiple production including a lamination process.

Object 6. To provide a wiring configuration with which a plurality of single-color display panels are connected from layer to layer in the multi-layer configuration thereof.

In the below, a multi-layer liquid crystal display element using a cholesteric liquid crystal material is used as an example to described a multi-layer display element and a manufacturing method therefor in the first and second embodiments.

First Embodiment

Figure 1:
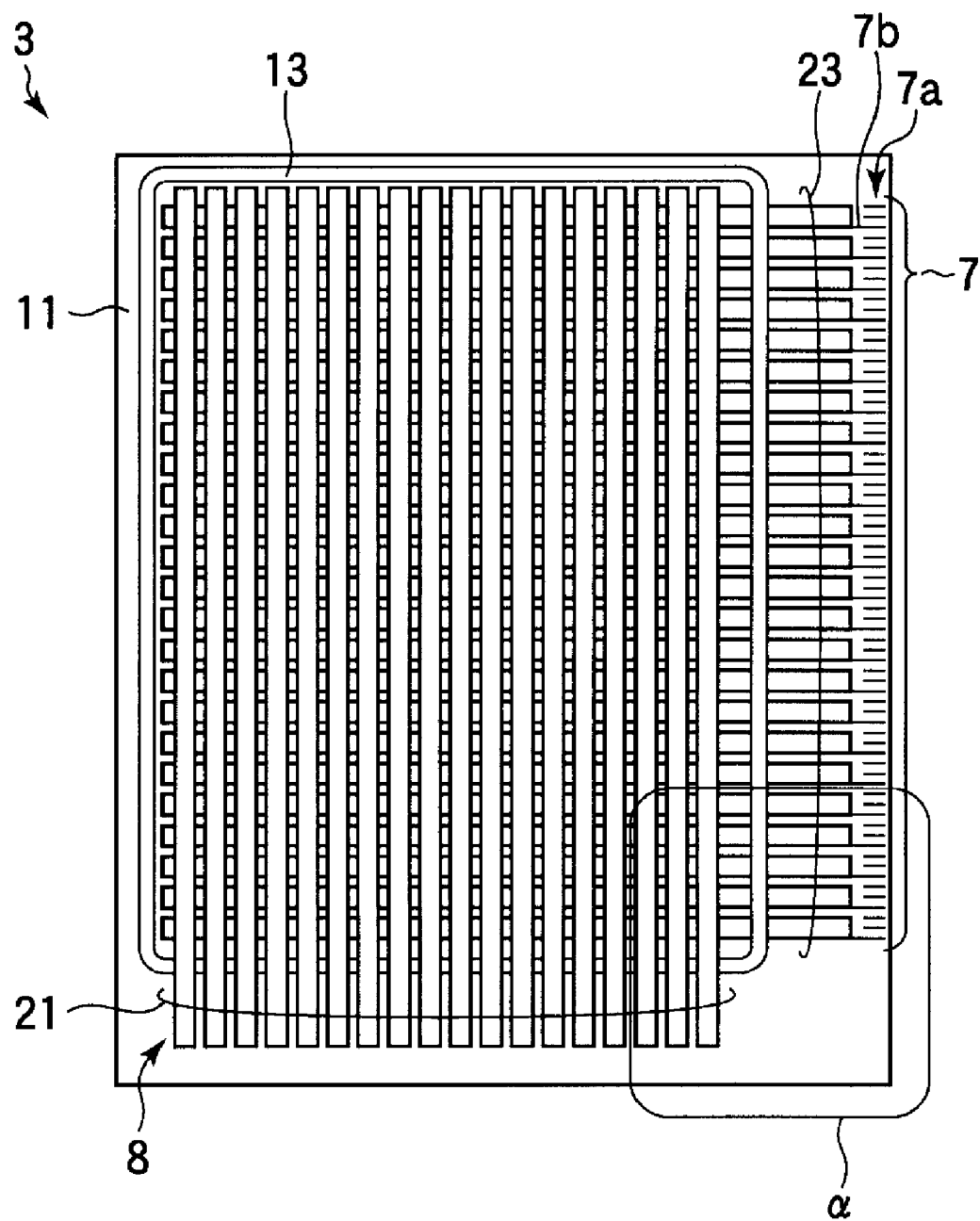
FIG. 1 is a plan view of a liquid crystal display panel 3 for use with a multi-layer liquid crystal display element 1 in a first embodiment.

By referring to FIGS. 1 to 10D, described are a multi-layer display element and a manufacturing method therefor in the first embodiment. By referring to FIGS. 1 to 2C, described first is a liquid crystal display panel for use with the multi-layer liquid crystal display element of the first embodiment. A liquid crystal display panel 3 of FIGS. 1 to 2C is used for a multi-layer liquid crystal display element configured by various liquid crystal materials, which have almost the same voltage characteristics but display various colors. FIG. 1 is a plan view of the liquid crystal display panel 3, showing the schematic configuration thereof. FIGS. 2A to 2C are each an enlarged view of an area α of FIG. 1. Specifically, FIG. 2A is a plan view of the liquid crystal display panel 3 specifically in the area α of FIG. 1, FIG. 2B is a cross-sectional view of the liquid crystal display panel 3 cut along a line A-A of FIG. 2A, and FIG. 2C is a schematic diagram of a data signal output terminal group 7 at the cross section cut along a line B-B of FIG. 2A.

As depicted in FIGS. 1 to 2C, the liquid crystal display panel 3 is configured to include a data electrode substrate 11, and a scanning electrode substrate 9 disposed to oppose the data electrode substrate 11. The data electrode substrate 11 is formed thereon with a plurality of data electrodes 23, and the scanning electrode substrate 9 is formed thereon with a plurality of scanning electrodes 21 that are so disposed as to intersect with the data electrodes 23. The scanning electrode substrate 9 and the data electrode substrate 11 are almost of the same size in a rectangular shape. These electrode substrates 9 and 11 are each a film substrate made of polycarbonate (PC), polyethylene terephthalate (PET), or others, and have light-transmissive characteristics, for example. The electrode substrates 9 and 11 remain to keep a predetermined distance therebetween by spacers (not depicted) dispersed therebetween. The electrode substrates 9 and 11 are laminated together by a sealing material 13. To the area enclosed by the sealing material 13 between the electrode substrates 9 and 11, a cholesteric liquid crystal material is injected and then sealed.

The liquid crystal display panel 3 is configured to include the data signal output terminal group 7, and a scanning signal output terminal group 8. From the data signal output terminal group 7, data signals are provided for respectively driving a plurality of data electrodes 23, and from the scanning signal output terminal group 8, scanning signals are provided for respectively driving a plurality of scanning electrodes 21. As will be described later, a multi-layer liquid crystal display element being a laminate of the liquid crystal display panels 3 can share the scanning signals so that end portions of the scanning electrodes 21 serve as the scanning signal output terminal group 8.

The data signal output terminal group 7 includes a plurality of standoff terminals 7a, and pull-out terminals 7b as many as the data electrodes 23. The standoff terminals 7a are those respectively disposed in the vicinity of end portions of the data electrodes 23, and data signals are provided therefrom. The pull-out terminals 7b are those extended and pulled respectively from the end portions of the data electrodes 23 to be disposed in parallel to the standoff terminals 7a. The standoff terminals 7a are electrically isolated from the data electrodes 23 and the pull-out terminals 7b. As depicted in FIG. 2A, in the liquid crystal display panel 3, every data electrode 23 is provided with two standoff terminals 7a and one pull-out terminal 7b. The total number of the terminals provided to one data electrode 23, i.e., the standoff terminals 7a and the pull-out terminal 7b, is equal to the maximum number of laminated layers in the multi-layer liquid crystal display element. As such, with the liquid crystal display panel 3, the resulting multi-layer liquid crystal display element will have three layers at the maximum.

The standoff terminals 7a are disposed to be isolated from the data electrodes 23. Accordingly, as will be described in more detail later, the multi-layer liquid crystal display element enables input of signals to the data electrodes, i.e., data signals whose drive pulses vary depending on which of the laminated liquid crystal display panels 3. The standoff terminals 7a each have a substantially rectangular shape when they are viewed in a substrate-plane normal direction of the data electrode substrate 11. The longitudinal direction of the standoff terminals 7a is almost the same as the direction along which the data electrodes 23 are extended, and the latitudinal direction thereof is almost the same as the direction along which the scanning electrodes 21 are extended. The pull-out terminals 7b each have almost the same length as that of the standoff terminals 7a both in the longitudinal and latitudinal directions.

The standoff terminals 7a are each so configured as to satisfy the following two relational expressions:

$$ip1 \leq dp/n \qquad 1$$

$$iw1 \leq dp/(2 \times n) \qquad 2$$

where ip1 denotes a terminal pitch of the standoff terminals 7a, iw1 denotes a terminal width thereof, dp denotes a wiring pitch of the data electrodes 23, and n denotes the number of layers of the laminated liquid crystal display panels 3.

Moreover, the pull-out terminals 7b are each so configured as to satisfy the following two relational expressions:

$$ep1 \leq dp/n \qquad 3$$

$$ew1 \leq dp/(2 \times n) \qquad 4$$

where ep1 denotes a pitch between the standoff terminals 7a and the pull-out terminals 7b, and ew1 denotes a terminal width of the pull-out terminals 7b.

With the liquid crystal display panel in the first and second previous technologies, i.e., the passive-matrix-type liquid crystal display panel in which the stripe-shaped data and scanning electrodes are disposed orthogonal to each other, in the display section and the connection terminal section, the electrodes are each made of a transparent material such as ITO (Indium Tin Oxide), and IZO (Indium Zic Oxide). As will be described later, in this embodiment, for achieving Objects 1 to 6, a multi-layer liquid crystal display panel 2 is connected to an FPC 27 by wire bonding connection. In consideration thereof, in this embodiment, the wire-bonding-connected portion is changed in electrode configuration from the one in the previous technologies, and is made of a material different from the one in the previous technologies so as to increase the efficiency and reliability of the wire-bonding-connected portion.

As an exemplary configuration to increase the efficiency and reliability of the wire-bonding-connected portion as such, as depicted in FIG. 2C, the data signal output terminal group 7 is provided with a metal conductive layer 14 formed each on the set of the standoff terminals 7a and the pull-out terminal 7b as required. The metal conductive layer 14 is disposed on the outer periphery of the sealing material 13 used to laminate together the data electrode substrate 11 and the scanning electrode substrate 9. The metal conductive layer 14 has the area wide enough for wire bonding. The metal conductive layer is formed by vapor deposition or plating. The metal conductive layer 14 is made of a material available for wire bonding, e.g., gold (Au), or aluminum (Al). The metal conductive layer 14 is generally required to have a film thickness of about 0.2 μm. The data electrodes 23 have to be made of a transparent conductive material such as ITO and IZO. The standoff terminals 7a and the pull-out terminals 7b are made of the same material as that of the data electrodes 23 at the same time. For improving the level of adhesion of the metal conductive layer 14 made of a bonding-possible Au, Al, or others to the standoff terminals 7a and the pull-out terminals 7b made of ITO, IZO, or others, a base layer is preferably sandwiched between the metal conductive layer 14 and the standoff and pull-out terminals 7a and 7b, i.e., the three-layer configuration is preferably established. The base layer is made of nickel (Ni), titanium (Ti), and others. The total film thickness of the resulting configuration including the standoff-terminals 7a or the pull-out terminals 7b, the base layer, and the metal conductive layer 14 is equal to or thinner than the thickness of a liquid crystal layer 5 of the liquid crystal display panel 3. Accordingly, only laminating together a plurality of liquid crystal display panels 3 can lead, with ease, to a multi-layer liquid crystal display panel being flat.

Figure 3:
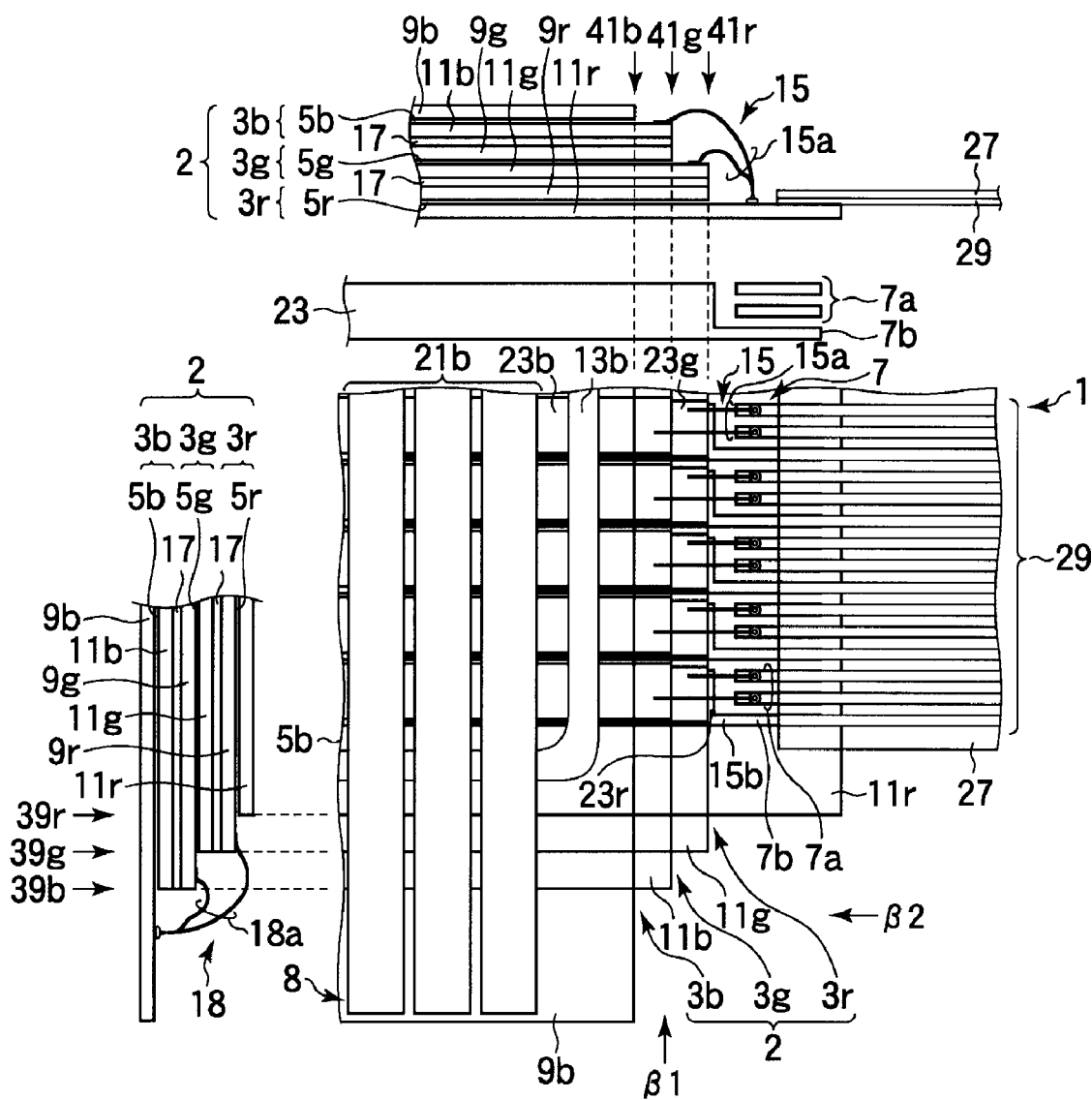
FIG. 3 is a diagram showing a corner section of the multi-layer liquid crystal display element 1 in the first embodiment.

Described next is the multi-layer liquid crystal display element 1 of this embodiment by referring to FIG. 3. The multi-layer liquid crystal display element 1 of this embodiment is a laminate of the three liquid crystal display panels 3. FIG. 3 is an enlarged view of a corner section of the multi-layer liquid crystal display element 1 of this embodiment. FIG. 3 shows, from the lower right to the upper right, in this order, the plan view of the corner section of the multi-layer liquid crystal display element 1, the plan view of the data electrode 23, and the side view of the multi-layer liquid crystal display element 1 viewed in a direction of 131 in the plan view. FIG. 3 also shows, in the left portion thereof, the side view of the multi-layer liquid crystal display element 1 viewed in a direction of β2 in the plan view.

As depicted in FIG. 3, the multi-layer liquid crystal display element 1 is configured to include an R (Red)-use liquid crystal display panel (first display panel) 3r, and a B (Blue)-use liquid crystal display panel (second display panel) 3b. The R-use liquid crystal display panel 3r includes a data electrode substrate (first data electrode substrate) 11r formed thereon with a plurality of data electrodes (first data electrodes) 23r, and a scanning electrode substrate (first scanning electrode substrate) 9r formed thereon with a plurality of first scanning electrodes (not depicted) 21r. The first scanning electrodes are so disposed as to intersect with the data electrodes 23r, and the scanning electrode substrate 9r is disposed to oppose the data electrode substrate 11 so as to expose end portions of the data electrodes 23r and those of the first scanning electrodes 21r. The B-use liquid crystal display panel 3b includes a data electrode substrate (second data electrode substrate) 11b formed thereon with a plurality of data electrodes (second data electrodes) 23b, and a scanning electrode substrate (second scanning electrode substrate) 9b formed thereon with a plurality of scanning electrodes (second scanning electrodes) 21b. The scanning electrodes 21b are so disposed as to intersect with the data electrodes 23b, and the scanning electrode substrate 9b is disposed to oppose the data electrode substrate 11b so as to expose end portions of the data electrodes 23b and those of the scanning electrodes 21b.

The first scanning electrode has almost the same shape as the scanning electrode 21 of FIG. 1, and is so disposed as to overlay the scanning electrode 9b when it is viewed in the substrate-plane normal direction of the scanning electrode substrate 9r. For convenience, in the below, the first scanning electrodes are referred to as "scanning electrodes 21r".

The multi-layer liquid crystal display element 1 is configured to include also a G (Green)-use liquid crystal display panel (third display panel) 3g, which is sandwiched between the R- and B-use liquid crystal display panels 3r and 3b. Such R-, G-, and B-use liquid crystal display panels 3r, 3g, and 3b configure the multi-layer liquid crystal display panel 2. The G-use liquid crystal display panel 3g is configured to include a data electrode substrate (third data electrode substrate) 11g formed thereon with a plurality of data electrodes (third data electrodes) 23g, and a scanning electrode substrate (third scanning electrode substrate) 9g formed thereon with a plurality of third scanning electrodes (not depicted). The third scanning electrodes are so disposed as to intersect with the data electrodes 23g, and the scanning electrode substrate 9g is disposed to oppose the data electrode substrate 11g so as to expose end portions of the data electrodes 23g and those of the third scanning electrodes. The third scanning electrodes each have almost the same shape as the scanning electrodes 21 of FIG. 1, and are so disposed as to overlay the scanning electrodes 21r and 21b when they are viewed in the substrate-plane normal direction of the scanning electrode substrate 9g. For convenience, in the below, the third scanning electrodes are referred to as "scanning electrodes 21g".

The B-, G-, and R-use liquid crystal display panels 3b, 3g, and 3r are laminated in this order from the display surface side. Such R-, G-, and B-use liquid crystal display panels 3r, 3g, and 3b configure the multi-layer liquid crystal display panel 2.

The multi-layer liquid crystal display element 1 is configured to include the data signal output terminal group 7, and the scanning signal output terminal group 8. From the data signal output terminal group 7, data signals are provided for driving a plurality of data electrodes 23r, 23g, and 23b, and from the scanning signal output terminal group 8, scanning signals are provided for driving a plurality of scanning electrodes 21r, 21g, and 21b. The data signal output terminal group 7 is formed at the end portion of the data electrode substrate 11r, and the scanning signal output terminal group 8 is formed to be served by the end portions of the scanning electrodes 21b. The data signal output terminal group 7 includes a plurality of standoff terminals (first standoff terminals) 7a, and a plurality of pull-out terminals (first pull-out terminals) 7b, which are shaped similar to those of the liquid crystal display panel 3 of FIGS. 2A to 2C. The standoff terminals 7a and the pull-out terminals 7b are each formed thereon with, as required, a metal conductive layer similar to that of FIGS. 2A to 2C. In the scanning signal output terminal group 8, a metal conductive layer made of the same material and at the same time as the metal conductive layer 14 of FIGS. 2A to 2C may be provided on the scanning electrodes 21b serving also as the scanning signal output terminal group 8.

As depicted in the upper portion of FIG. 3, the R-use liquid crystal display panel 3r is so configured as to expose the data signal output terminal group 7 from the end portion thereof by cutting the scanning electrode substrate 9r thereof and the data electrode substrate 11g of the G-use liquid crystal display panel 3g along a cut line 41r indicated by a broken line. The G-use liquid crystal display panel 3g is so configured as to expose the data electrodes 23g thereof by cutting the scanning electrode substrate 9g thereof and the data electrode substrate 11b of the B-use liquid crystal display panel 3b along a cut line 41g indicated by a broken line. The B-use liquid crystal display panel 3b is so configured as to expose the data electrodes 23b thereof by cutting the scanning electrode substrate 9b thereof along a cut line 41b indicated by a broken line. As a result, the multi-layer liquid crystal display element 1 has the configuration that the side surface portion provided with the data signal output terminal group 7 is formed with a height difference like a staircase so that the data signal output terminal group 7 and the data electrodes 23g and 23b are made visible.

As depicted in the left portion of FIG. 3, the B-use liquid crystal display panel 3b is so configured as to expose, from the end portion thereof, end portions of the scanning electrodes 21b serving also as the scanning signal output terminal group 8 by cutting the data electrode substrate 11b thereof, and the scanning electrode substrate 9g of the G-use liquid crystal display panel 3g along a cut line 39b indicated by a broken line. The G-use liquid crystal display panel 3g is so configured as to expose end portions of the scanning electrodes 21g thereof by cutting the data electrode substrate 11g thereof and the scanning electrode substrate 9r of the R-use liquid crystal display panel 3r along a cut line 39g indicated by a broken line. The R-use liquid crystal display panel 3r is so configured as to expose the scanning electrodes 21r thereof by cutting the data electrode substrate 11r thereof along a cut line 39r indicated by a broken line. As a result, the multi-layer liquid crystal display element 1 has the configuration that the side surface portion provided with the scanning signal output terminal group 8 is formed with a height difference like a staircase so that the scanning signal output terminal group 8 and the scanning electrodes 21g and 21b are made visible.

The multi-layer liquid crystal display element 1 is configured to include a data electrode connection wire rod group 15, and a scanning electrode connection wire rod group 18. The data electrode connection wire rod group 15 is provided with a plurality of conductive wire rods 15a for use to connect between the data electrodes 23g and 23b and the data signal output terminal group 7. The scanning electrode connection wire rod group 18 is provided with a plurality of conductive wire rods 18a for use to connect between the scanning electrodes 21r and 21g and the scanning signal output terminal group 8. The data electrode connection wire rod group 15 is provided with a pull-out section 15b, which is formed integrally with the data electrodes 23r and functions similarly to the conductive wire rods 15a. The data electrode connection wire rod group 15 connects, by the conductive wire rods 15a, the data electrodes 23g and 23b and the standoff terminals 7a exposed from the end portion of the multi-layer liquid crystal display element 1, and by the pull-out section 15b, connects the data electrodes 23r and the pull-out terminals 7b. By selecting any process not requiring a high-temperature process for such a connection using the conductive wire rods 15a, the multi-layer liquid crystal display element 1 can use the electrode substrates 9r, 9g, 9b, 11r, 11g, and 11b each being a film substrate.

The data electrodes 23g and 23b are each connected to the data signal output terminal group 7 by wire bonding, for example, and the scanning electrodes 21r and 21g are each connected to the scanning signal output terminal group 8 also by wire bonding. With the wire bonding, the data electrodes 23g and 23b, and the scanning electrodes 21r and 21g are on the second side. Note that, in this embodiment, the data electrodes 23r are respectively being connected to the pull-out terminals 7b by the pull-out section 15b. Alternatively, in the multi-layer liquid crystal display element 1, as an alternative to the pull-out terminals 7b, the data signal output terminal group 7 may be additionally provided with standoff termi-nals, and the standoff terminals may be connected to the data electrodes 23r by wire bonding using the conductive wire rods 15a. Similarly, the scanning electrodes 21b are so configured that their end portions serve also as the scanning signal output terminal group 8. Alternatively, in the multi-layer liquid crystal display element 1, standoff terminals may be provided similarly to the data-electrode side, and the standoff terminals may be connected to the scanning electrodes 21r, 21g, and 21b by wire bonding using the conductive wire rods 18a.

The second previous technology is predicated on crimp connection of the FPCs via the ACFs, and this resultantly causes a problem of increasing the frame area having nothing to do with display. In consideration thereof, this embodiment adopts wire bonding for a connection between the data signal output terminal group 7 and the data electrodes 23g and 23b, and a connection between the scanning signal output terminal group 8 and the scanning electrodes 21r and 21g. Such wire bonding connection requires a width of only about a fraction of what they used to be with the ACF connection. Accordingly, the multi-layer liquid crystal display element 1 of this embodiment can favorably reduce the width of the frame area.

When a ball bonder is used for wire bonding connection, in the staircase-like data electrode substrates 11r, 11g, and 11b, the side of the data electrode substrate 11b located on the top is assumed as being first bonding. In this configuration, there is a possibility that the height of a wire loop to be formed or the height of a coating resin for protection use after bonding may exceed the upper surface of the scanning electrode substrate 9b. This thus increases the thickness of the multi-layer liquid crystal display element 1 in the frame area. In this embodiment, the multi-layer liquid crystal display element 1 is of a configuration that the first bonding is on the side of the data signal output terminal group 7 of the data electrode substrate 11r, and on the side of the scanning signal output terminal group 8 of the scanning electrode substrate 9b. On the second side, the height of the wire loop is relatively low. Therefore, if the side of the data electrode substrate 11b is second bonding, the coating resin for protection use after bonding is prevented from exceeding the upper surface of the scanning electrode substrate 9b. This accordingly reduces the thickness of the multi-layer liquid crystal display element 1.

In the data signal output terminal group 7, every data electrode 23r is provided with two standoff terminals 7a and one pull-out terminal 7b. When viewed in the substrate-plane normal direction of the data electrode substrate 11r, the data electrodes 23g and 23b disposed over the data electrode 23r are connected to, using the conductive wire rods 15a, the two standoff terminals 7a disposed in the vicinity of an end portion of the data electrode 23r. Accordingly, in the multi-layer liquid crystal display element 1, the data electrodes 23r, 23g, and 23b of the R-, G-, and B-use liquid crystal display panels 3r, 3g, and 3b can be provided with data signals varying in drive pulse. This thus enables the multi-layer liquid crystal display element 1 to display color images.

As depicted in the lower right portion of FIG. 3, the data electrode 23b is connected to, by the conductive wire rod 15a, the standoff terminal 7a located adjacent to the pull-out terminal 7b pulled out from the data electrode 23r disposed over the data electrode 23b, for example. The data electrode 23g is being connected to another standoff terminal 7a adjacent to the standoff terminal 7a being connected with the data electrode 23b disposed over the data electrode 23g. The pull-out terminal 7b is being connected to the data electrode 23r by the pull-out section 15b. As such, in the data signal output terminal group 7, the pull-out terminal 7b and the two standoff terminals 7a are disposed repeatedly in this order, i.e., the pull-out terminal 7b is the one for providing R-use data signals from the side of the scanning signal output terminal group 8 of the data electrode substrate 11r, the pull-out terminal 7a is the one for providing B-use data signals therefrom, and another pull-out terminal 7a is the one for providing G-use data signals therefrom.

The R-, G-, and B-use liquid crystal layers 5r, 5g, and 5b respectively provided to the R-, G-, and B-use liquid crystal display panels 3r, 3g, and 3b have almost the same voltage characteristics. The scanning signals can thus be drive-pulse signals of the same voltage to be input to the scanning electrodes 21r, 21g, and 21b at the same timing. This is the reason why the standoff terminal and the pull-out terminal are not provided on the side of the scanning electrodes 21r, 21g, and 21b unlike on the side of the data electrodes 23r, 23g, and 23b. The scanning electrode connection wire rod group 18 is used for a connection between the exposed portions, i.e., the exposed portion of the scanning electrode 21 serving as the scanning signal output terminal group 8 is connected with the exposed portions of the scanning electrodes 21r and 21g disposed thereover when they are viewed in the substrate-plane normal direction of the scanning electrode substrate 9b. In the multi-layer liquid crystal display element 1, the scanning electrodes 21r, 21g, and 21b are of shared use.

The multi-layer liquid crystal display element 1 is configured to include a flexible printed substrate (data electrode drive circuit substrate) 27, and another flexible printed substrate (scanning electrode drive circuit substrate) that is not depicted. The former flexible printed substrate is being connected to the data signal output terminal group 7, and the latter is connected to the scanning signal output terminal group 8. The flexible printed substrate (FPC) 27 is provided with a plurality of data signal wiring patterns 29 for input of the data signals. The data signal wiring patterns 29 provided to the FPC 27 are as many as the total number of the standoff terminals 7a and the pull-out terminals 7b provided to the data signal output terminal group 7. The data signal wiring patterns 29 share almost the same wire width and wire pitch as the standoff terminal 7a and the pull-out terminal 7b. Such data signal wiring patterns 29 are respectively connected to a plurality of standoff terminals 7a and a plurality of pull-out terminals 7b via an ACF (Anisotropic Conductive Film) that is not depicted. The FPC 27 is mounted with a liquid-crystal drive IC (not depicted) for driving the data electrodes, for example. The liquid-crystal drive IC is so configured as to output R-, G-, and B-use data signals repeatedly in this order to the data signal wiring patterns 29 from the lower to upper portions of the drawing. This accordingly enables the data signal output terminal group 7 to output any predetermined data signals respectively to a plurality of data electrodes 23r, 23b, and 23g.

The flexible printed substrate (FPC) connected to the scanning signal output terminal group 8 has the scanning signal wiring patterns as many as the scanning electrodes 21b. Such scanning signal wiring patterns are respectively connected to, via the ACF, a plurality of scanning electrodes 21b serving also as the scanning signal output terminal group 8. The FPC is mounted with a liquid-crystal drive IC for driving the scanning electrodes, for example. The liquid-crystal drive IC is so configured as to sequentially output the scanning signals to the scanning signal wiring patterns. This thus allows the scanning signal output terminal group 8 to output any predetermined scanning signals to a plurality of scanning electrodes 21r, 21g, and 21b.

In the multi-layer liquid crystal display element 1, the side of the data electrodes 23r, 23g, and 23b is of the staircase-like configuration reverse to that on the side of the scanning electrodes 21r, 21g, and 21b. Before the terminals are cut and removed from the data electrode substrate and the scanning electrode substrate using a cutter, in the R-, G-, and B-use liquid crystal display panels 3r, 3g, and 3b, the data electrodes 23r, 23g, and 23b share the same electrode pattern, and the scanning electrodes 21r, 21g, and 21b also share the same electrode pattern. This means that, before a patterning process to be executed to the data electrodes and the scanning electrodes, their multiple production is possible for roll- or sheet-like film substrate without distinguishing the color, i.e., R, G, or B. In this sense, the multi-layer liquid crystal display element 1 of this embodiment is satisfactorily good for volume production.

As described above, in the multi-layer liquid crystal display element 1, at one end portion of the data electrode substrate 11r, other than the pull-out terminal 7b directly connected to the data electrode 23r, every data electrode 23r is provided with two standoff terminals 7a that are electrically isolated therefrom. The data electrodes 23g and 23b of the two liquid crystal display panels 3g and 3b laminated above the R-use liquid crystal display panel 3r are respectively connected and relayed to the standoff terminals 7a using the conductive wire rods 15a. As such, the data electrodes 23r, 23g, and 23b are all gathered to the data electrode substrate 11r located at the bottom. With such a configuration, in the multi-layer liquid crystal display element 1, by connecting the FPC 27 only to the data signal output terminal group 7 of the data electrode substrate 11r, all of the data electrodes 23r, 23g, and 23b can be connected to an external drive circuit (not depicted). Similarly, also in the multi-layer liquid crystal display element 1, the scanning electrodes 21r and 21g are connected to the scanning signal output terminal group 8, i.e., one end portions of the scanning electrodes 21b formed to the scanning electrode substrate 9b, using the conductive wire rods 18a. As such, the scanning electrodes 21r, 21g, and 21b are all gathered to the scanning electrode substrate 9b located on the top. With such a configuration, also in the multi-layer liquid crystal display element 1, by connecting the FPC only to the scanning signal output terminal group 8 of the scanning electrode substrate 9b, all of the scanning electrodes 21r, 21g, and 21b can be connected to an external drive circuit (not depicted). Accordingly, in the multi-layer liquid crystal display element 1 of this embodiment, the number of the connection points with the external drive circuit can be reduced down to one each on the data electrode side and the scanning electrode side.

The R-, G-, and B-use liquid crystal display panels 3r, 3g, and 3b are of the configuration almost the same as that of the liquid crystal display panel 3 of FIG. 1 except that the end portions of their substrates are so cut as to expose the data electrodes and the scanning electrodes, and are thus not described in detail again. The multi-layer liquid crystal display element 1 includes an adhesive layer 17 that is formed by an adhesive agent coated almost entirely over the lamination surface of each of the R-, G-, and B-use liquid crystal display panels 3r, 3g, and 3b. The R-use liquid crystal display panel 3r includes the R-use liquid crystal layer 5r that is disposed on the inner radius side of a sealing material (not depicted), and is sandwiched between the electrode substrates 9r and 11r. The R-use liquid crystal layer 5r is so configured as to reflect lights of red by indicating a reflection state for light reflection, a light-transmission state for light transmission, or an intermediate state between the reflection state and the light-transmission state. Such an R-use liquid crystal layer 5r includes an R-use cholesteric liquid crystal material in which an average refractive index n and a helical pitch p are both adjusted for selectively reflecting the color of red.

The data electrode substrate 11r and the scanning electrode substrate 9r are so disposed that their electrode-formed surfaces are opposed to each other, i.e., the surface formed with the data electrodes 23r, and the surface formed with the scanning electrodes 21r. The data electrodes 23r and the scanning electrodes 21r formed to the R-use liquid crystal display panel 3r are formed in a stripe shape, for example. At an intersection portion of the data electrode 23r and the scanning electrode 21r, an R-use pixel is formed. As to the R-use pixel, the pixel pitch in the direction along which the scanning electrodes 21r are extending is equal to the wire pitch of the data electrodes 23r, and the pixel pitch in the direction along which the data electrodes 23r are extending is equal to the wire pitch of the scanning electrodes 21r. Such an R-use pixels are arranged in a matrix. The data electrodes 23r and the scanning electrodes 21r are typically made of ITO, for example, but a transparent conductive film such as IZO, or a photoconductive film such as amorphous silicon will also do.

The G-use liquid crystal display panel 3g includes the G-use liquid crystal layer 5g that reflects lights of green unlike the R-use liquid crystal layer 5r reflecting lights of red. The G-use liquid crystal layer 5g indicates a reflection state for light reflection, a light-transmission state for light transmission, or an intermediate state between the reflection state and the light-transmission state. Such a G-use liquid crystal layer 5g includes a G-use cholesteric liquid crystal material in which an average refractive index n and a helical pitch p are both adjusted for selectively reflecting the color of green.

The B-use liquid crystal display panel 3b includes the B-use liquid crystal layer 5b that reflects lights of blue unlike the R- and G-use liquid crystal layers 5r and 5g reflecting lights of red and green, respectively. The B-use liquid crystal layer 5b indicates a reflection state for light reflection, a light-transmission state for light transmission, or an intermediate state between the reflection state and the light-transmission state. Such a B-use liquid crystal layer 5b includes a B-use cholesteric liquid crystal material in which an average refractive index n and a helical pitch p are both adjusted for selectively reflecting the color of blue.

The G- and B-use liquid crystal display panels 3g and 3b are respectively provided with a G- and B-use pixels at the respective intersections of the data electrodes 23g and 23b and the scanning electrodes 21g and 21b, which are respectively made of the same material and in the same shape as the data electrodes 23r and the scanning electrodes 21r. A set of B-, G-, and R-use pixels configure a pixel in the multi-layer liquid crystal display element 1. The multi-layer liquid crystal display element 1 is of a passive-matrix type whose display screen is configured by such pixels arranged in a matrix. The R-, G-, and B-use liquid crystal display panels 3r, 3g, and 3b are each provided with a liquid crystal layer reflecting different colors of lights. This thus enables the multi-layer liquid crystal display element 1 to perform color display.

The liquid crystal material configuring the R-, G-, and B-use liquid crystal layers 5r, 5g, and 5b is a cholesteric liquid crystal material with 10 to 40 wt % of a chiral material in a nematic liquid crystal mixture. The addition rate of the chiral material here is the value when the total amount of the nematic liquid crystal composition and the chiral material is 100 wt %. Although the nematic liquid crystal material can be any of those various previously known, but preferably, the cholesteric liquid crystal composition has the anisotropic permittivity $\Delta\epsilon$ falling within the range of $20 \leq \Delta\epsilon \leq 50$. When the anisotropic permittivity $\Delta\epsilon$ takes a value too small considering the above range, the liquid crystal layers 5r, 5g, and 5b are increased in drive voltage. On the other hand, when the anisotropic permittivity $\Delta\epsilon$ takes a value too large considering the above range, the multi-layer liquid crystal display element 1 is reduced in stability and reliability, thereby easily causing image defect and image noise.

The anisotropic refractive index $\Delta n$ of the cholesteric liquid crystal material is considered important physical properties that control the image quality. The anisotropic refractive index $\Delta n$ preferably takes a value falling within the range of $0.18 \leq \Delta n \leq 0.24$. When the anisotropic refractive index $\Delta n$ takes a value too small to fall within the above range, the liquid crystal layers 5r, 5g, and 5b in the planer state are reduced in reflectivity, whereby the resulting display will look dark due to the insufficient brightness. On the other hand, when the anisotropic refractive index $\Delta n$ takes a value too large to fall within the above range, the liquid crystal layers 5r, 5g, and 5b are increased in diffusing reflection in focal conic state, whereby the resulting display screen will look blurred due to the insufficient purity and contrast. Also when the anisotropic refractive index $\Delta n$ takes a value too large to fall within the above range, the viscosity is increased, thereby reducing the response speed of the cholesteric liquid crystal material.

The cholesteric liquid crystal material preferably takes a value of resistivity $\rho$ in a range of $10^{10} \leq \rho \leq 10^{13}$ ($\Omega \cdot cm$). Moreover, the lower viscosity is considered preferable for the cholesteric liquid crystal material because, when the temperature is low, any possible voltage increase and contrast reduction can be suppressed thereby.

The multi-layer liquid crystal display element 1 is made of an interference-reflection-type cholesteric liquid crystal material for passive matrix drive. This accordingly allows the multi-layer liquid crystal display element 1 to be of the laminate configuration with a fewer number of components and with the simplicity and flexibility. The resulting multi-layer liquid crystal display element 1 can thus provide display free from reduction of brightness even with a high pixel density, i.e., high pixel definition.

The scanning electrode substrates 9r, 9g, and 9b, and the data electrode substrates 11r, 11g, and 11b are required to have the light-transmission characteristics. Such electrode substrates 9r, 9g, 9b, 11r, 11g, and 11b are each a film substrate made of polycarbonate, polyethylene terephthalate, and others. In this embodiment, although the electrode substrates 9r, 9g, 9b, 11r, 11g, and 11b are each provided with the light-transmission characteristics, the data electrode substrate 11r of the R-use liquid crystal display panel 3r disposed at the bottom is not necessarily light transmissive.

The multi-layer liquid crystal display element 1 includes a visible-light absorption layer (not depicted) on the outer surface (rear surface) of the data electrode substrate 11r of the R-use liquid crystal display panel 3r. Therefore, when the R-, G-, and B-use liquid crystal layers 5r, 5g, and 5b are all in the focal conic state, the multi-layer liquid crystal display element 1 looks black on the display screen thereof. Note here that the visible-light absorption layer may be provided whenever needed.

In the multi-layer liquid crystal display element 1, the liquid-crystal drive IC and the data electrodes 23r, 23g, and 23b can be connected together by a single piece of FPC 27. Also in the multi-layer liquid crystal display element 1, when the output terminals of the liquid-crystal drive IC 33 are as many as the total number of the data electrodes 23r, 23g, and 23b, these can be shared among the R-, G-, and B-use liquid crystal display panels 3r, 3g, and 3b.

The multi-layer liquid crystal display element 1 is also provided with an FPC carrying thereon a liquid-crystal drive IC connected to a plurality of scanning signal input terminals. The scanning electrodes 21r, 21g, and 21b are collectively disposed on the scanning electrode substrate 9b of the B-use liquid crystal display panel 3b. With such a configuration, in the multi-layer liquid crystal display element 1, the liquid-crystal drive IC and the scanning electrodes 21r, 21g, and 21b can be connected together using a single piece of FPC. Accordingly, in the multi-layer liquid crystal display element 1 in this embodiment, unlike the previous multi-layer liquid crystal display element 100, there is no more need to include, to each of the liquid crystal display panels 3r, 3g, and 3b, the FPC and the liquid-crystal drive ICs for driving the data and scanning electrodes, thereby being able to reduce the number of components and the connection portions. As such, in this embodiment, the resulting multi-layer liquid crystal display element can be low in cost and high in reliability.

Figure 6A:
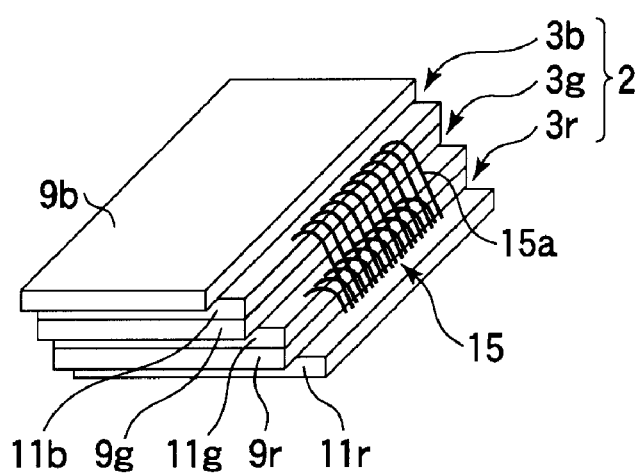
FIGS. 6A and 6B are diagrams for illustrating a wiring process in the manufacturing method for the multi-layer liquid crystal display element 1 in the first embodiment.
Figure 6B:
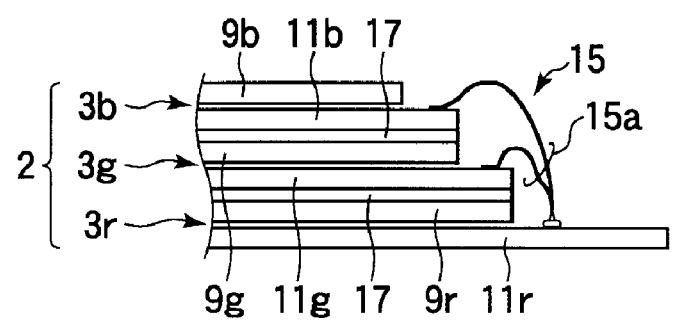

Described next is a manufacturing method for the multi-layer liquid crystal display element of the embodiment by referring to FIGS. 1 to 8D. FIGS. 4A to 4D are diagrams for illustrating a lamination process of the liquid crystal display panels of the multi-layer liquid crystal display element 1 of the embodiment. FIGS. 5A to 5D are diagrams for illustrating a terminal exposing process in the manufacturing method for the multi-layer liquid crystal display element 1. Specifically, FIG. 5A is a perspective view of the multi-layer liquid crystal display panel 2 after the cutting of the substrate end portions, and FIGS. 5B to 5D are each a cross sectional view of the multi-layer liquid crystal display element 1, showing the terminal exposing process in the manufacturing process therefor. FIGS. 6A and 6B are diagrams for illustrating a wiring process of the manufacturing method for the multi-layer liquid crystal display element 1.

First of all, as depicted in FIGS. 1 to 2C, the data electrode substrate 11 is formed with a plurality of data electrodes 23 each in a stripe shape, and the data signal output terminal group 7 disposed at the end portions of the data electrodes 23. The scanning electrode substrate 9 is then formed with a plurality of scanning electrodes 21 each in a stripe shape, and the scanning signal output terminal group 8. The scanning signal output terminal group 8 is formed integrally with the scanning electrodes 21 so that the end portions of the scanning electrodes 21 are so configured as to serve also as the scanning signal output terminal group 8. By vapor deposition or plating when needed, the standoff terminals 7a and the pull-out terminals 7b disposed in the data signal output terminal group 7 are formed thereon with a base layer (not depicted) and the metal conductive layer 14 in this order. The total film thickness of the resulting configuration, i.e., the standoff terminals 7a or the pull-out terminals 7b, and the base layer, and the metal conductive layer 14, is equal to or thinner than the film thickness of any of the R-, G-, and B-use liquid crystal layers 5r, 5g, and 5b (refer to FIG. 3) whichever the thinnest. Moreover, as required, on the scanning electrodes 21 serving also as the scanning signal output terminal group 8, a metal conductive layer (not depicted) similar to the metal conductive layer 14 is formed. This accordingly allows the R-, G-, and B-use liquid crystal display panels 3r, 3g, and 3b to share a layer lamination process to be executed to the metal conductive layer 14 and the base layer, thereby being able to increase the level of volume production for the multi-layer liquid crystal display element 1.

As depicted in FIGS. 2A to 2C, the data electrode substrate 11 and the scanning electrode substrate 9 are so attached together that their electrode-formed surfaces are opposed to each other to interest the data electrodes 23 with the scanning electrodes 21. Between the data electrode substrate 11 and the scanning electrode substrate 9, an R-use liquid crystal material is injected, and then the resulting R-use liquid crystal layer (display material layer) is sealed so that the R-use liquid crystal display panel (first display panel) 3r is formed. With the similar manufacturing method used as such to the R-use liquid crystal display panel 3r, the G-use liquid crystal display panel (third display panel) 3g, and the B-use liquid crystal display panel (second display panel) 3b are manufactured. In the G-, and B-use liquid crystal display panels 3g and 3b, the G-, and B-use liquid crystal layers 5g and 5b are respectively sealed between the data electrode substrates 11g and 11b and the scanning electrode substrates 9g and 9b, respectively.

Before the R-, G-, and B-use liquid crystal display panels 3r, 3g, and 3b are laminated together, i.e., when the panels are each a single-color panel, the R-, G-, and B-use liquid crystal display panels 3r, 3g, and 3b are each in the shape of rectangular parallelepiped being the result of attaching together the substrates having almost the same outside shape, i.e., the data electrode substrates 11r, 11g, and 11b, and the scanning electrode substrates 9r, 9g, and 9b. In this state, the scanning electrode substrates 9r, 9g, and 9b are respectively covering the data signal output terminal group 7 and the end portions of the data electrodes 23r, 23g, and 23b formed to the data electrode substrates 11r, 11g, and 11b. Moreover, the data electrode substrates 11r, 11g, and 11b are respectively covering the scanning signal output terminal group 8 and the end portions of the data electrodes 21r, 21g, and 21b formed to the scanning electrode substrates 9r, 9g, and 9b.

Figure 4A:
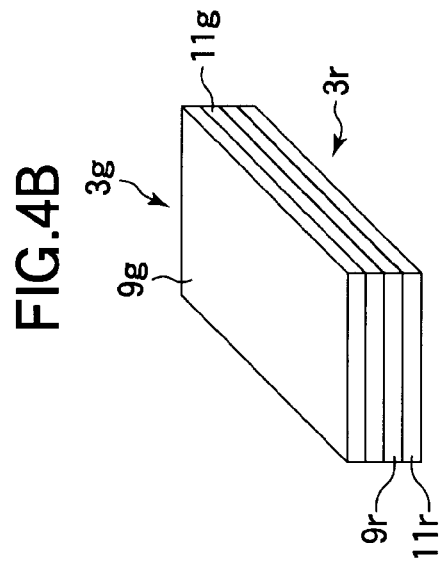
FIGS. 4A to 4D are diagrams for illustrating a lamination process in a manufacturing method for the multi-layer liquid crystal display element 1 in the first embodiment.
Figure 4B:
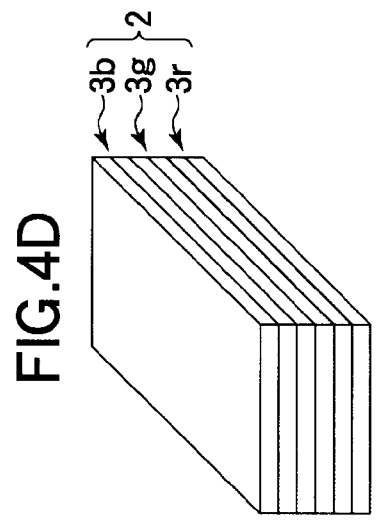

Next, as depicted in FIG. 4A, on the scanning electrode substrate 9r of the R-use liquid crystal display panel 3r, for example, a transparent adhesive agent 16 satisfying the optical characteristics is dropped or coated. The scanning electrode substrate 9r is then disposed to oppose the data electrode substrate 11g of the G-use liquid crystal display panel 3g, and then the G-use liquid crystal display panel 3g is positioned from above of the R-use liquid crystal display panel 3r for lamination. The transparent adhesive agent 16 is then cured by visible lights or heat, for example. As such, as depicted in FIG. 4B, the R-use liquid crystal display panel 3r and the G-use liquid crystal display panel 3g are laminated together.

Figure 4C:
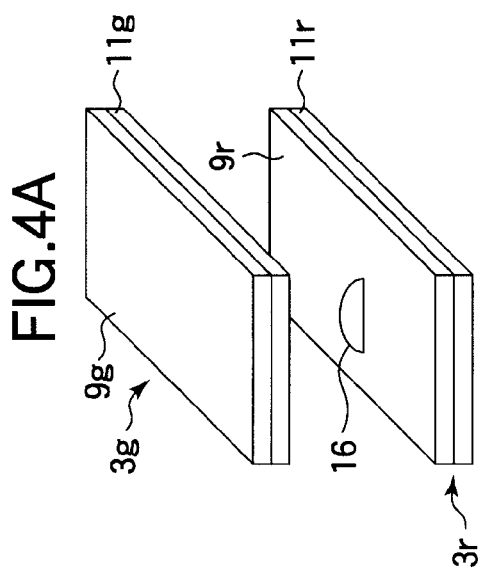
Figure 4D:
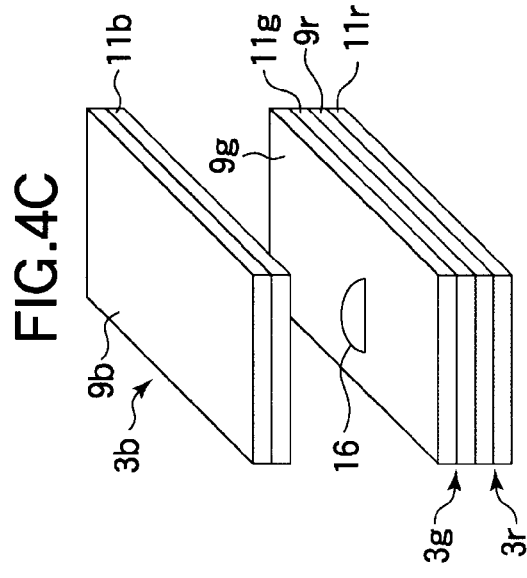

Next, with the similar procedure to the above, the B-use liquid crystal display panel 3b is laminated on the G-use liquid crystal display panel 3g. First of all, as depicted in FIG. 4C, on the scanning electrode substrate 9g of the G-use liquid crystal display panel 3g, the transparent adhesive agent 16 satisfying the optical characteristics is dropped or coated. The scanning electrode substrate 9g is then disposed to oppose the data electrode substrate 11b of the B-use liquid crystal display panel 3b, and then the G-use liquid crystal display panel 3g is positioned for lamination with the B-use liquid crystal display panel 3b. The transparent adhesive agent 16 is then cured by visible lights or heat, for example. As such, as depicted in FIG. 4D, the R-, G-, and B-use liquid crystal display panels 3r, 3g, and 3b are laminated together so that the multi-layer liquid crystal display panel 2 is configured.

In the lamination process of FIGS. 4A to 4D, the R-, G-, and B-use liquid crystal display panels 3r, 3g, and 3b may be positioned based on a positioning mark provided to each thereof. Alternatively, if the positioning accuracy is guaranteed for the electrode patterns, i.e., the pattern of the data electrodes 23r, 23g, and 23b, and the pattern of the scanning electrodes 21r, 21g, and 21b, with respect to the outside shape of the data electrode substrates 11r, 11g, and 11b, and to the outside shape of the scanning electrode substrates 9r, 9g, and 9b, any two orthogonal sides of the outside shape of the data electrode substrates 11r, 11g, and 11b and that of the scanning electrode substrates 9r, 9g, and 9b may be pushed against to each other, thereby positioning the R-, G-, and B-use liquid crystal display panels 3r, 3g, and 3b. Moreover, as described above, because the data signal output terminal group 7 and the scanning signal output terminal group 8 for a connection to the external drive circuit are not both exposed before the lamination process, the transparent adhesive agent 16 can be dropped or coated with a sufficient amount for the entire plane for attaching.

Next, as depicted in FIG. 5A, the end portions of the electrode substrates are cut, i.e., the data electrode substrates 11g and 11b, and the scanning electrode substrates 9r, 9g, and 9b. The reason of this cutting is for exposing the end portions of the data electrodes 23r and the data signal input terminal group 7 on the data electrode substrate 11r located on the outermost side (refer to FIG. 3), and the end portions of the data electrodes 23g and 23b on the data electrode substrates (remaining of the data electrode substrates) 11g and 11b (refer to FIG. 3). Thereafter, the remaining end portions of the electrode substrates are cut, i.e., the R- and G-use data electrode substrates 9r and 9g, and the data electrode substrates 11r, 11g, and 11b. The reason of this cutting is for exposing the scanning signal input terminal group 8 of the scanning electrode substrate 9b located on the outermost side, and the end portions of the scanning electrodes 21r and 21g on the scanning electrode substrates (remaining of the scanning electrode substrates) 9r and 9g (refer to FIG. 3).

By referring to FIGS. 5B to 5D, such a terminal exposing process of cutting the substrate end portions of the multi-layer liquid crystal display panel 2 to expose the electrodes 21r, 21g, 21b, 23r, 23g, 23b, and others is described in more detail. In the external area of the sealing material (not depicted), the data electrode substrates 11r, 11g, and 11b are disposed with a space from the scanning electrode substrates 9r, 9g, and 9b. This space is almost equal to the total thickness of the R-, G-, and B-use liquid crystal layers 5r, 5g, and 5b (refer to FIG. 3). For example, using a cutter 20 of FIGS. 5B to 5D, the end portions of the electrode substrates 11b, 9g, 11g, and 9r are sequentially cut starting from the data electrode substrate 9b located on the top. The cutter 20 is configured to include a stopper section 20a, and a blade section 20b. The cutter 20 can be adjusted in the length in the depth direction of the blade section 20b protruding from the lower surface of the stopper section 20a.

Next, the end portions of the data electrode substrates 11g and 11b, and the end portions of the scanning electrode substrates 9r, 9g, and 9b are cut to expose the data signal output terminal group 7 of the data electrode substrate 11r located on the outermost side among the data electrode substrates 11r, 11g, and 11b, and the end portions of the data electrodes 23g and 23b of the data electrode substrates (remaining of the above data electrode substrates) 11g and 11b. To be specific, as depicted in FIG. 5B, first of all, the blade section 20b is protruded from the lower surface of the stopper section 20a by the thickness of the scanning electrode substrate 9b. After such a protrusion, the end portion is cut from the scanning electrode substrate 9b located on the outermost side at a predetermined space from the end portion of the scanning electrode substrate 9b to expose the data signal output terminal group 7 and one end portions of the data electrodes 23b (all not depicted) formed on the data electrode substrate 11b. This accordingly exposes the data signal output terminal group 7 and the end portions of the data electrodes 23b formed on the data electrode substrate 11b. Next, as depicted in FIG. 5C, the blade section 20b is protruded from the lower surface of the stopper section 20a by the total thickness of the data electrode substrate 11b, the adhesive layer 17, and the scanning electrode substrate 9g, thereby pushing the side surface of the stopper section 20a against the cut-surface of the scanning electrode substrate 9b. Thereafter, the data electrode substrate 11b and the scanning electrode substrate 9g attached face to face together are cut at their end portions at the same time. Accordingly, the one end portions of the data electrodes 23b remain intact as a result of cutting the data signal output terminal group 7 formed on the data electrode substrate 11b, and the end portions of the data electrodes 23g and the data signal output terminal group 7 (both not depicted) formed on the data electrode substrate 11g are exposed.

Next, as depicted in FIG. 5D, the blade section 20b is protruded from the lower surface of the stopper section 20a by the total thickness of the data electrode substrate 11g, the adhesive layer 17, and the scanning electrode substrate 9r, thereby pushing the side surface of the stopper section 20a against the cut-surface of the scanning electrode substrate 9g. Thereafter, the data electrode substrate 11g and the scanning electrode substrate 9r attached face to face together are cut at their end portions at the same time. Accordingly, the data electrodes 23b remain intact as a result of cutting the data signal output terminal group 7 formed on the data electrode substrate 11g, and the data signal output terminal group 7 (not depicted) formed on the data electrode substrate 11r is exposed.

As such, the end portion of the scanning electrode substrate 9b located on the outermost side is cut separately, and then the data electrode substrate 11b and the scanning electrode substrate 9g laminated face to face are cut at their end portions at the same time. In other words, a pair of the data electrode substrate 11b and the scanning electrode substrate 9g laminated face to face is cut at its end portion. Thereafter, the data electrode substrate 11g and the scanning electrode substrate 9r laminated face to face are cut at their end portions at the same time. In other words, a pair of the data electrode substrate 11g and the scanning electrode substrate 9r laminated face to face is cut at its end portion. That is, using the cutter 20, the substrate end portions of the multi-layer liquid crystal display panel 2 are cut and removed while sequentially shifting the cutting position from the upper layer side like a staircase, e.g., one layer, two layers, and two layers, in this order, thereby leading to the terminal configuration with the staircase-like cross section.

With the procedure similar to the side of the data electrodes 23r, 23g, and 23b, the scanning electrodes 21r and 21g are exposed together with the scanning signal output terminal group 8. The scanning electrode substrates 9r and 9g and the data electrode substrates 11r and 11g are cut at their end portions to expose the scanning signal output terminal group 8 on the scanning electrode substrate 9b located on the outermost side, and one end portions of the scanning electrodes 21r and 21g of the scanning electrode substrates 9r and 9g (remaining of the scanning electrode substrates above). The end portions of the electrode substrates to be cut at this time are not those cut in the terminal exposing process executed to the data electrodes 23g and 23b, and the data signal output terminal group 7, i.e., not the end portions of the scanning electrode substrates 9r, 9g, and 9b, and those of the data electrode substrates 11g and 11b. On the side of the scanning electrodes 21r, 21g, and 21b, the cutting is started from the data electrode substrate 11r. That is, the data electrode substrate 11r located on the outermost side is cut first at its end portion, and then the scanning electrode substrate 9r and the data electrode substrate 11g laminated face to face together are cut at their end portions at the same time. Thereafter, the scanning electrode substrate 9g and the data electrode substrate 11b laminated face to face together are cut at their end portions at the same time.

In such a cutting process, the cutting is not necessarily completely performed using the cutter 20 depending on the film material used for the electrode substrates 9r, 9g, 9b, 11r, 11g, and 11b. For example, a groove may be formed to the electrode substrates using the cutter 20 for folding and cutting, and then the end portions of the electrode substrates may be folded and cut. Using such a manufacturing method can avoid any problem of erroneously scratching the data electrodes, the scanning electrodes, and others formed to the electrode substrates located below the substrate being in process even if the cutter 20 has a dimensional deviation in the depth direction, or even if the electrode substrates 9r, 9g, and 9b, 11r, 11g, and 11b vary in thickness, for example.

Next, as depicted in FIGS. 6A and 6B, using a plurality of conductive wire rods 15a configuring the data electrode connection wire rod group 15, the exposed portions of the data electrodes 23g and 23b of the G-, and B-use liquid crystal display panels 3g and 3b (refer to FIG. 3) are connected to the standoff-terminals 7a located in the exposed portion of the data signal output terminal group 7 of the R-use liquid crystal display panel 3r (refer to FIG. 3). Similarly, using a plurality of conductive wire rods 18a configuring the scanning electrode connection wire rod group 18, the exposed portions of the scanning electrodes 21r and 21g of the R-, and G-use liquid crystal display panels 3g and 3b (refer to FIG. 3) are connected to the exposed portion of the scanning signal output terminal group 8 of the B-use liquid crystal display panel 3b (refer to FIG. 3). Such a connection is made by wire bonding, for example.

Next, the FPC 27 is connected onto the standoff terminals 7a and the pull-out terminals 7b of the data signal output terminal group 7 via the ACF, (refer to FIG. 3), and another FPC (not depicted) is connected to the scanning signal output terminal group 8. Next, the end portions of the FPCs on the side not connected to the multi-layer liquid crystal display panel 2 are connected to a control drive circuit substrate (not depicted). This accordingly configures the multi-layer liquid crystal display element 1.

Figure 7A:
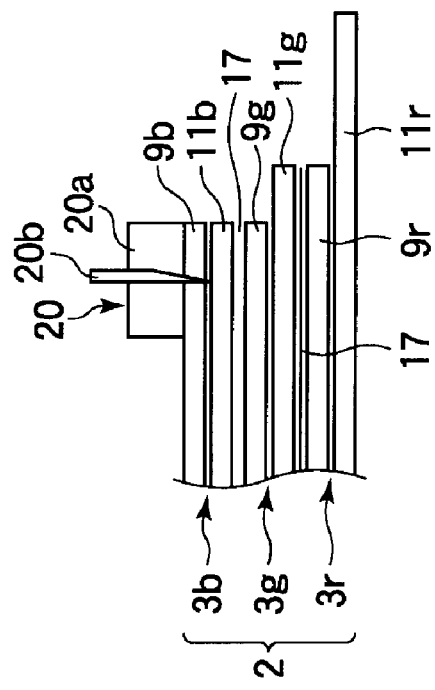
FIGS. 7A to 7D are other diagrams for illustrating the terminal exposing process in the manufacturing method for the multi-layer liquid crystal display element 1 in the first embodiment.
Figure 7C:
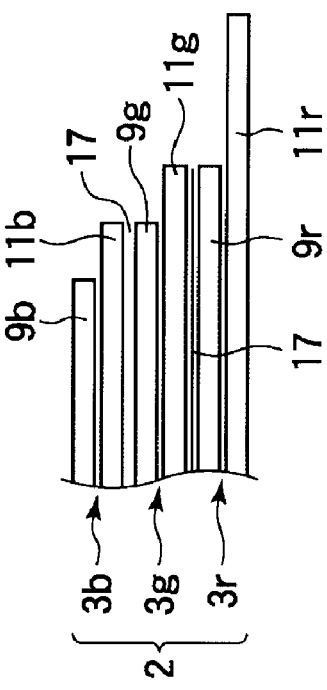
Figure 7B:
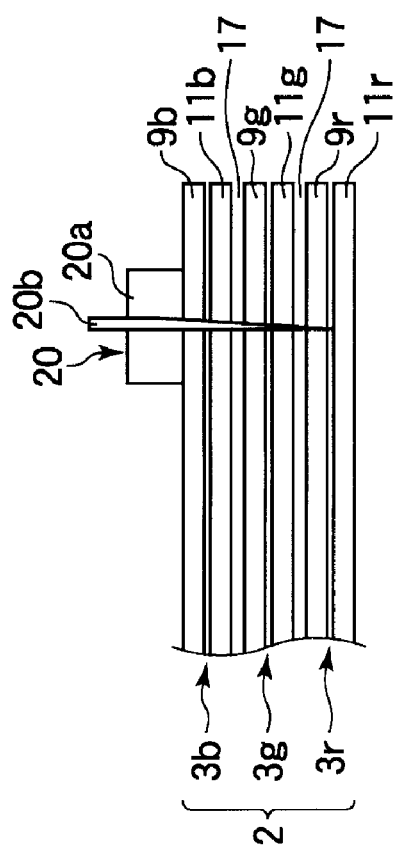
Figure 7D:
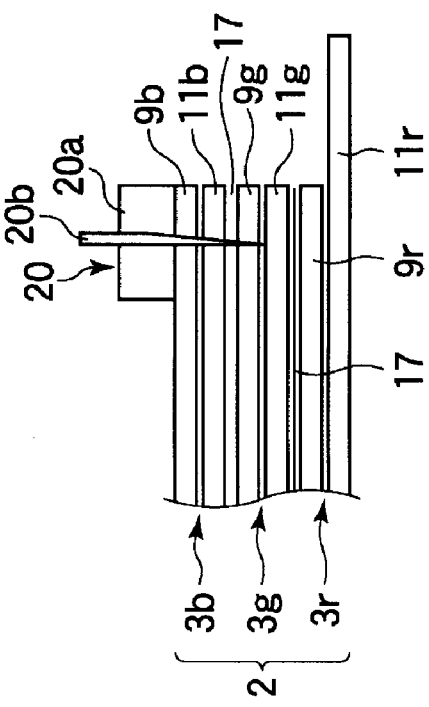

FIGS. 7A to 8D show another substrate cutting method in the terminal exposing process of FIGS. 5A to 5D. FIGS. 7A to 7D show a method for exposing a terminal portion of a data electrode or others sequentially from the electrode substrate located at the bottom. As depicted in FIG. 7A, in a first cutting process, the five layers of the electrode substrates 9b, 11b, 9g, 11g, and 9r not including the data electrode substrate 11r are cut so as to expose the data signal output terminal group 7 formed to the data electrode substrate 11r. Then, as depicted in FIG. 7B, the substrate end portions of the electrode substrates 9b, 11b, and 9g are cut so that the data electrode 23g is exposed. Then, as depicted in FIG. 7C, the scanning electrode substrate 9b is cut so that the data electrode 23b is exposed. After the completion of such a procedure, as depicted in FIG. 7D, in the cross section, the resulting multi-layer liquid crystal display panel 2 has the end portions formed like a staircase. With the processes of FIGS. 7A to 7D, there is a slight difficulty in ensuring the strength and life of the blade section of the cutter 20, and ensuring the vertical surface accuracy of the cut surfaces of the substrates.

FIGS. 8A to 8D show, similarly to the manufacturing process of FIGS. 5A to 5D, a more preferable method for cutting the substrate end portions starting from the electrode substrate located on the top. As depicted in FIGS. 8A to 8C, a cutter 19 is configured to include a stopper section 19a having the L-shaped cross section, and a blade section 19b. The cutter 20 of FIGS. 4A to 4C has a problem that the surface of the stopper section 20a rubs the upper surface of the data electrode exposed as a result of cutting the electrode substrates. Such a problem occurs when the surface of the stopper section 20a faces the multi-layer liquid crystal display panel 2, and determines how deep the blade tip of the blade section 20b is to be pushed. There thus is a possibility that the cutter 20 may scratch or stain the surface of the electrode substrate on which the electrodes are formed. On the other hand, the cutter 19 is so configured as to include a space section 40 between the surface of the stopper section 19a, and the surface of the multi-layer liquid crystal display panel 2. The surface of the stopper section 19a is facing the multi-layer liquid crystal display panel 2, and determines how deep the blade tip of the blade section 19b is to be pushed. This configuration favorably prevents the cutter 19 from rubbing the electrode-formed surfaces of the electrode substrates, thereby being able to protect the electrode-formed surfaces of the electrode substrates from any possible scratches and stains. Moreover, the stopper section 19a has the L-shaped cross section, and thus the cutter 19 can easily determine the cutting position using a guide section 19c whose reference is the end of the electrode substrates.

As depicted in FIG. 8A, the surface of the guide section 19c on the side of the blade section 19b is made to come in contact with the side surface of the multi-layer liquid crystal display panel 2, thereby cutting the scanning electrode substrate 9b. This accordingly exposes the data electrode 23b (not depicted). Next, as depicted in FIG. 8B, by reducing the distance from the guide section 19c to the blade section 19b, and by adjusting the length of the blade section 19b exposing from the stopper section 19a, the data electrode substrate 11b and the scanning electrode substrate 9g are cut at the same time. This accordingly exposes the data electrode 23g (not depicted). Thereafter, as depicted in FIG. 8C, by reducing the distance from the guide section 19c to the blade section 19b to a further degree, the data electrode substrate 11g and the scanning electrode substrate 9r are cut at the same time. This accordingly exposes the data output terminal group 7 (not depicted). As such, the resulting multi-layer liquid crystal display panel 2 has the side surface shaped like a staircase. In such a cutting process, when the cutting is performed to the end portions of the second and third layers of FIGS. 8B and 8C, i.e., the G- and R-use liquid crystal display panels 3g and 3r, the electrode-formed surfaces of the electrode substrates 11b and 11g are being exposed below the stopper section 19a. However, because there is the space section 40 between the stopper section 19a and the electrode-formed surfaces, the electrode-formed surfaces of the data electrode substrates 11b and 11g remained intact on the multi-layer liquid crystal display panel 2 are favorably protected from any possible scratches and others.

As described above, according to the first embodiment, the number of the flexible printed substrates is reduced to two, i.e., provided on the scanning electrode side and the data electrode side, the number of the liquid-crystal drive ICs is reduced to two, and the frequency of ACF connection is also reduced to twice. As such, with the manufacturing method for the multi-layer liquid crystal display element of this embodiment, the number of the components can be considerably reduced compared with that in the first previous technology, and the number of processes is also greatly reduced because there is no more need to repeat ACF-crimping, and the crimping is performed only twice. As such, the first embodiment achieves the manufacturing method excellent in mass productivity for the multi-layer liquid crystal display element 1. Also in the first embodiment, the frame area can be reduced compared with the second previous technology, and a film substrate can be used. In this embodiment, after dividing the multi-layer liquid crystal display panel 2 into pieces, the side surfaces of the resulting panel pieces are configured like a staircase, thereby enabling substrate-to-substrate wiring. Accordingly, in this embodiment, before the lamination process of FIG. 4D for the R-, G-, and B-use liquid crystal display panels 3r, 3g, and 3b, the multiple production is possible using the roll-like film substrate of FIGS. 21A to 21D.

With the manufacturing method for the liquid crystal display panel in the second previous technology, a plurality of liquid crystal display panels varying in size are laminated together. With such a configuration, if the amount of an adhesive agent and the size of a coating area are not controlled with good accuracy for coating on the attaching surface of the smaller-sized liquid crystal display panel, the adhesive agent may be squeezed out to the connection terminal section of the larger-size liquid crystal display panel. Such an adhesive agent squeezed as such may cover the connection terminal section, thereby causing a problem that not all of the terminals are to be electrically connected to the FPC. On the other hand, in this embodiment, the R-, G-, and B-use liquid crystal display panels 3r, 3g, and 3b to be laminated all have almost the same outer dimension, thereby being able to apply the amount of the adhesive agent adequate for almost entirely the attaching surface. Accordingly, in this embodiment, the multi-layer liquid crystal display element 1 can implement the strong attachment strength and the highly reliable FPC-crimping with such a simple manufacturing method.

Figure 9:
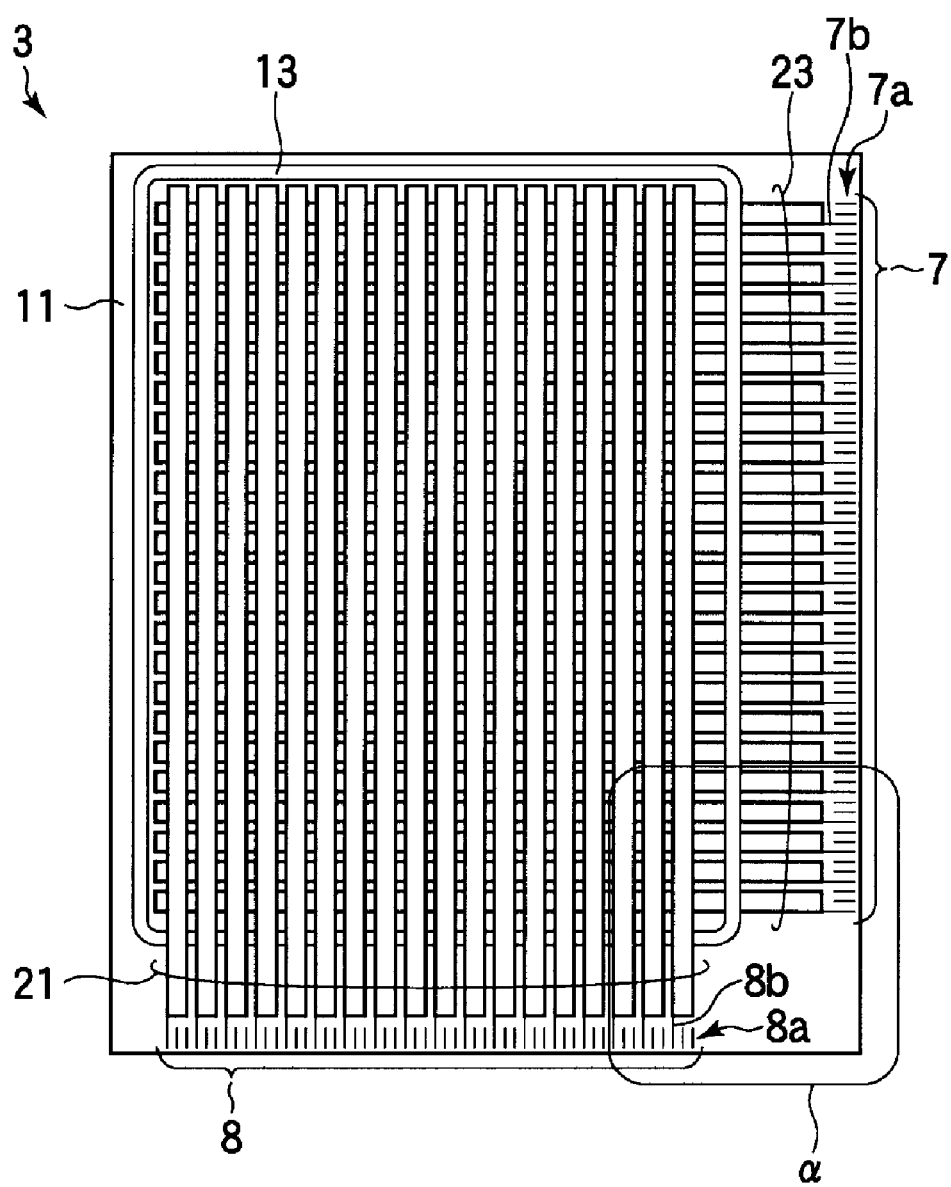
FIG. 9 is a plan view of the liquid crystal display panel 3 for use with the multi-layer liquid crystal display element 1 in a modified example of the first embodiment.

Described next is a multi-layer liquid crystal display element in a modified example of the first embodiment by referring to FIGS. 9 to 10D. The liquid crystal display panel 3 used in the multi-layer liquid crystal display element of this modified example is used when the liquid crystal materials displaying different colors have each different voltage characteristics. FIG. 9 is a plan view showing the schematic configuration of the liquid crystal display panel 3 in this modified example. FIGS. 10A to 10D are each an enlarged view of an area a of FIG. 9. Specifically, FIG. 10A is a plan view of the liquid crystal display panel in the area a of FIG. 9, FIG. 10B is a cross-sectional view of the liquid crystal display panel cut along a line A-A of FIG. 10A, FIG. 10C is a schematic diagram of the data signal output terminal group 7 on the cross section cut along a line B-B of FIG. 10A, and FIG. 10D is a schematic diagram of the scanning signal output terminal group 8 on the cross section cut along a line C-C of FIG. 10A. Note here that any component similarly to that of the liquid crystal display panel 3 of FIGS. 1 to 2D in terms of functions and effects is provided with the same reference numeral, and not described again.

When each color has its own voltage characteristics, there needs to provide a drive-pulse scanning signal varying in voltage value respectively to the R-, G-, and B-use liquid crystal display panels. In consideration thereof, as depicted in FIGS. 9 to 10D, the multi-layer liquid crystal display panel 3 for use in the multi-layer liquid crystal display element of this modified example is so configured that the scanning electrodes 21 are individually connected to the external drive circuit (not depicted). The scanning signal output terminal group 8 provided to the liquid crystal display panel 3 is configured to include a plurality of standoff terminals (second standoff terminals) 8a, and pull-out terminals (second pull-out terminals) 8b. The standoff terminals 8a are those disposed in the vicinity of one end portions of the scanning electrodes 21, and scanning signals are provided therefrom. The pull-out terminals 8b are those extended and pulled from the end portions of the scanning electrodes 21 to be disposed in parallel to the standoff terminals 8a. The standoff terminals 8a are electrically isolated from the scanning electrodes 21 and the pull-out terminals 8b. As depicted in FIG. 10A, in the liquid crystal display panel 3, every scanning electrode 21 is provided with two standoff terminals 8a and one pull-out terminal 8b. The total number of the standoff terminals 8a and the pull-out terminal 8b with respect to one scanning electrode 21 is equal to the maximum number of the laminated layers in the multi-layer liquid crystal display element. As such, with the liquid crystal display panel 3, the resulting multi-layer liquid crystal display element will have three layers at the maximum.

The standoff terminals 8a each have a substantially rectangular shape when they are viewed in a substrate-plane normal direction of the scanning electrode substrate 9. The longitudinal direction of the standoff terminals 8a is almost the same as the direction along which the scanning electrodes 21 are extended, and the latitudinal direction thereof is almost the same as the direction along which the data electrodes 23 are extended. The pull-out terminals 8b each have almost the same length as that of the standoff terminals 8a both in the longitudinal and latitudinal directions. The pull-out terminals 8b are formed integrally with the scanning electrodes 21 via a pull-out section 24, but alternatively, may be isolated from the scanning electrodes 21 as are the standoff terminals 8a. If this is the case, the pull-out terminals 8b are electrically connected to the scanning electrodes 21 by conductive wire rods (not depicted) similarly to the standoff terminals 8a.

The standoff terminals 8a are each so configured as to satisfy the following two relational expressions:

$$ip2 \leq sp/n \qquad 5$$

$$iw2 \leq sp/(2 \times n) \qquad 6$$

where ip2 denotes a terminal pitch of the standoff terminals 8a, iw2 denotes a terminal width thereof, sp denotes a wire pitch of the scanning electrodes 21, and n denotes the number of layers of the laminated liquid crystal display panels 3.

Moreover, the pull-out terminals 8b are each so configured as to satisfy the following two relational expressions:

$$ep2 \leq sp/n \qquad 7$$

$$ew2 \leq sp/(2 \times n) \qquad 8$$

where ep2 denotes a terminal pitch between the standoff terminals 8a and the pull-out terminals 8b, and ew2 denotes a terminal width of the pull-out terminals 8b.

As depicted in FIG. 10D, the scanning signal output terminal group 8 is provided with a metal conductive layer 12 formed each on the set of the standoff terminals 8a and the pull-out terminal 8b as required. The metal conductive layer 12 is disposed on the outer periphery of the sealing material 13 used to laminate together the scanning electrode substrate 9 and the data electrode substrate 11. The metal conductive layer 12 is made of a material similar to that of the metal conductive layer 14. The metal conductive layer 12 has a film thickness almost the same as that of the metal conductive layer 14. Moreover, beneath the metal conductive layer 12, a base layer made of Ni or others may be formed for increasing the level of adhesion between the metal conductive layer 12 and the standoff and pull-out terminals 8a and 8b similar to the base layer between the metal conductive layer 14 and the standoff and pull-out terminals 7a and 7b.

The multi-layer liquid crystal display element using the liquid crystal display panel 3 of FIGS. 9 to 10D is similar to the multi-layer liquid crystal display element 1 of FIG. 3 except that the scanning electrodes 21g and 21b are respectively connected to the standoff terminals 8a using conductive wire rods provided to the scanning electrode connection wire rod group (both not depicted), and thus is not described twice.

As described above, in this modified example, the multi-layer liquid crystal display element can be manufactured using liquid crystal materials varying in voltage characteristics. What is more, the multi-layer liquid crystal display element 1 of this modified example can achieve the effects similar to those achieved by the multi-layer liquid crystal display element 1 of FIG. 3.

Second Embodiment

Figure 11:
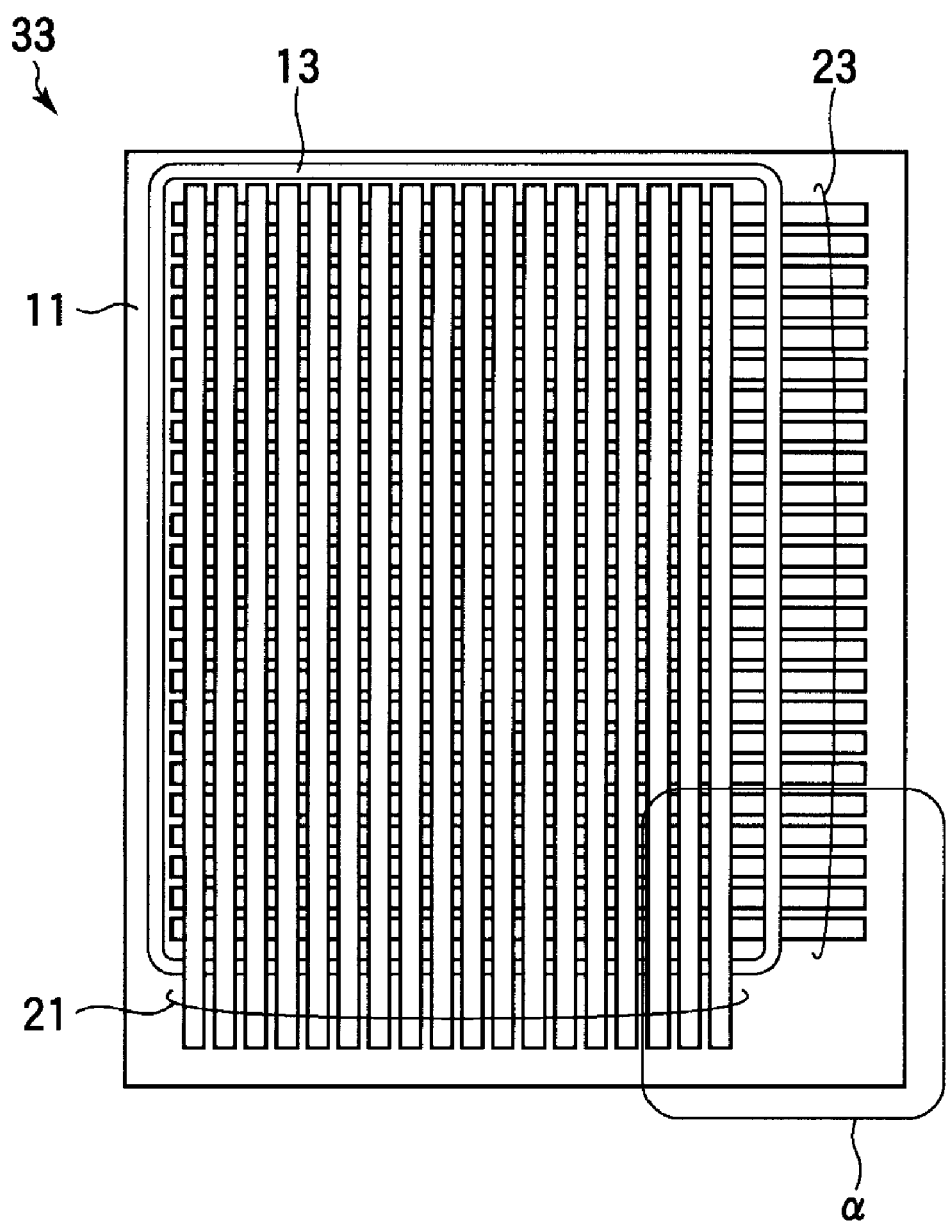
FIG. 11 is a plan view of a liquid crystal display panel 33 for use with a multi-layer liquid crystal display element 31 in a second embodiment.
Figure 12B:
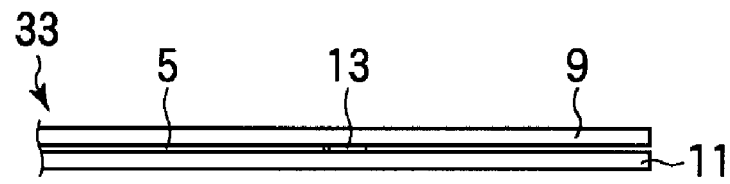
FIGS. 12A and 12B are each an enlarged view of the liquid crystal display panel 33 for use with the multi-layer liquid crystal display element 31 in the second embodiment.
Figure 12A:
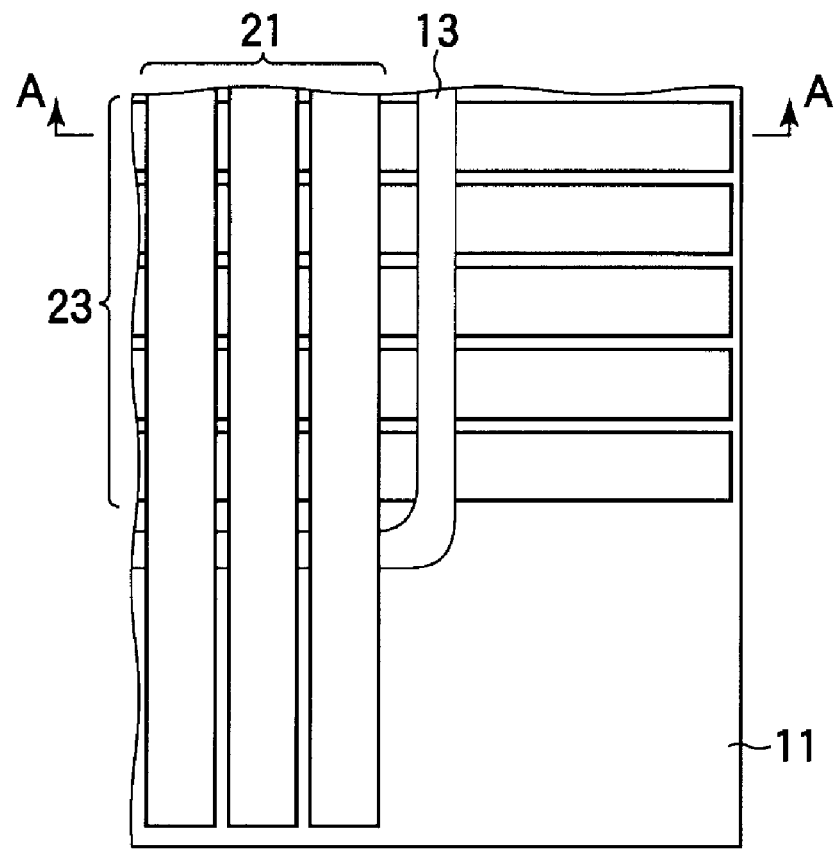

By referring to FIGS. 11 to 16, described next is a multi-layer liquid crystal display element and a manufacturing method therefor in a second embodiment. By referring to FIGS. 11 to 12B, described first is a liquid crystal display panel for use in the multi-layer liquid crystal display element of this embodiment. A liquid crystal display panel 33 of FIGS. 11 to 12B can be used irrespective of whether the liquid crystal materials have the same voltage characteristics or not, unlike the liquid crystal display panel 3 of the first embodiment. FIG. 11 is a plan view of the liquid crystal display panel 33, showing the schematic configuration thereof. FIGS. 12A and 12B are each an enlarged view of an area α of FIG. 11. Specifically, FIG. 12A is a plan view of the liquid crystal display panel 33 of the area α of FIG. 11, and FIG. 12B is a cross sectional view of the liquid crystal display panel 33 cut along a line A-A of FIG. 12A. Note here that any component similar to that in the liquid crystal display panel 3 of FIGS. 1 to 2D in terms of functions and effects is provided with the same reference numeral, and not described twice.

As depicted in FIGS. 11 to 12B, unlike the liquid crystal display panel 3, the liquid crystal display panel 33 is not provided with the data signal output terminal group and the scanning signal output terminal group. The liquid crystal display panel 33 is provided with a plurality of data electrodes 23, and a plurality of scanning electrodes 21. The data electrodes 23 are those each in a stripe shape extending from one end to the other end of the data electrode substrate 11, and the scanning electrodes 21 are those each in a stripe shape extending from one end to the other end of the scanning electrode substrate 9. The liquid crystal display panel 33 is configured similarly to the liquid crystal display panel 3 except for not including the data signal output terminal group and the scanning signal output terminal group.

Figure 13:
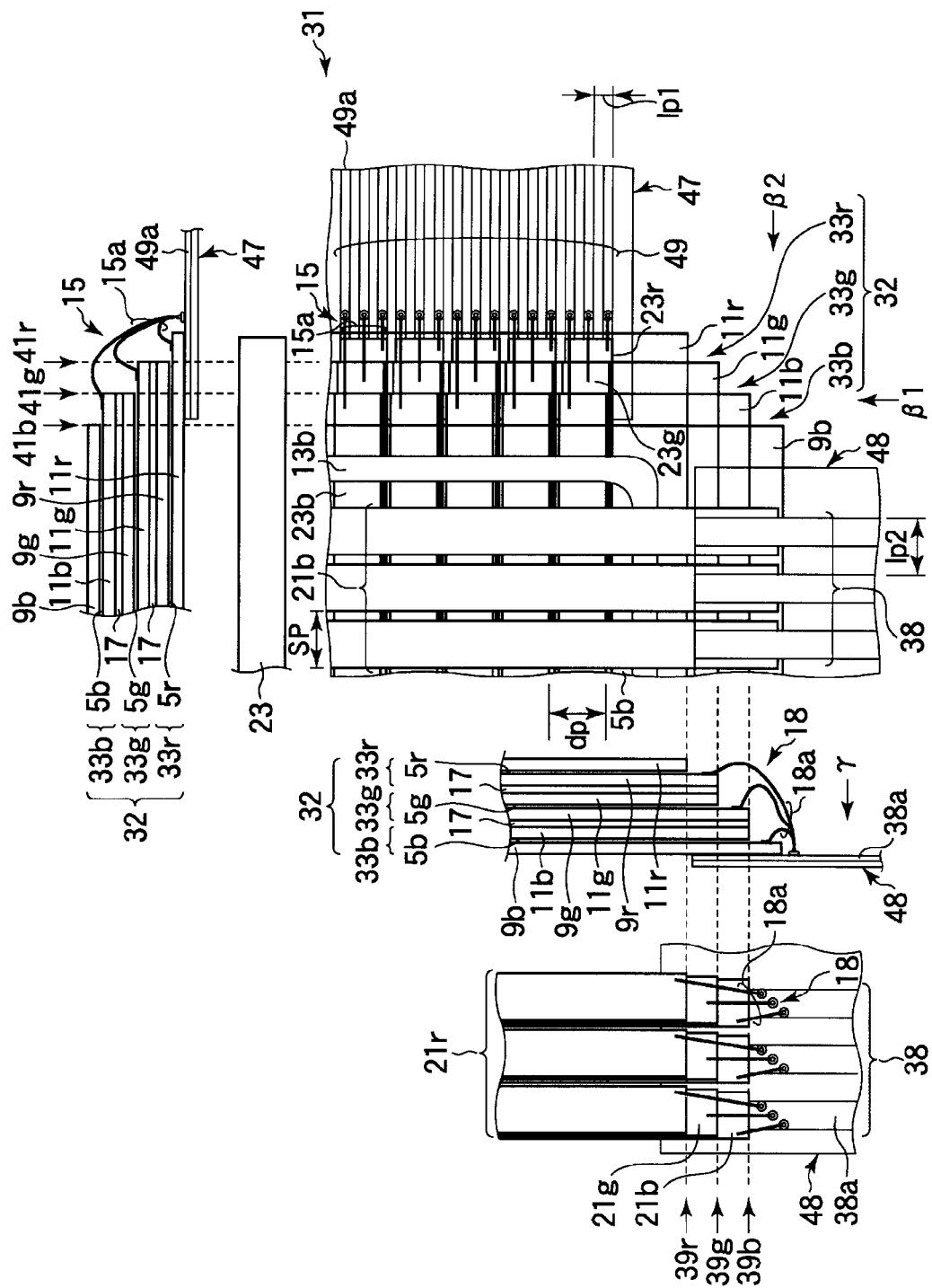
FIG. 13 is a diagram showing a corner section of the multi-layer liquid crystal display element 31 in the second embodiment.

By referring to FIG. 13, described next is a multi-layer liquid crystal display element 31 of this embodiment. The multi-layer liquid crystal display element of this embodiment is characterized in including a data signal output terminal group in a data signal drive circuit substrate, and including a scanning signal output terminal group in a scanning signal drive circuit. FIG. 13 is an enlarged view of a corner section of the multi-layer liquid crystal display element 31 of this embodiment. FIG. 13 shows, from the lower right to the upper right, in this order, the plan view of the corner section of the multi-layer liquid crystal display element 31, the plan view of the data electrode 23, and the side view of the multi-layer liquid crystal display element 31 viewed in a direction of β1 in the plan view. FIG. 13 also shows, on the left side to the plan views as such, the side view of the multi-layer liquid crystal display element 31 viewed in a direction of β2 in the plan view, and on the side left to such a side view, the plan view of the multi-layer liquid crystal display element 31 viewed in a direction of γ in the side view.

As depicted in FIG. 13, the multi-layer liquid crystal display element 31 is configured to include R-, G-, and B-use liquid crystal display panels 33r, 33g, and 33b, which are respectively provided with the R-, G-, and B-use liquid crystal layers 5r, 5g, and 5b all having almost the same voltage characteristics. Such R-, G-, and B-use liquid crystal display panels 33r, 33g, and 33b respectively include the data electrodes 23r, 23g, and 23b almost in the same pattern. For the multi-layer liquid crystal display element 31 to display color images, there needs to apply drive pulses of different waveforms respectively to the data electrodes 23r, 23g, and 23b of the R-, G-, and B-use liquid crystal display panels 33r, 33g, and 33b. In consideration thereof, the multi-layer liquid crystal display element 31 of this embodiment is configured to include an FPC (data signal drive circuit substrate) 47, and an FPC (scanning signal drive circuit substrate) 48. The FPC 47 is connected to the underside of the surface formed with the data electrodes (first data electrodes) 23r of the data electrode substrate (first data electrode substrate) 11r, and is provided with a data signal output terminal group 49. The FPC 48 is connected to the underside of the surface formed with the scanning electrodes (second data electrodes) 21b of the scanning electrode substrate (second data electrode substrate) 9b, and is provided with a scanning signal output terminal group 38.

The data signal output terminal group 49 is provided with a plurality of wire terminals (first wire terminals) 49a that are each in a stripe shape, and serve as a wire electrode. The scanning signal output terminal group 38 is provided with a plurality of wire terminals (second wire terminals) 38a that are each in a stripe shape, and serve also as a wire electrode. The data electrodes 23r, 23g, and 23b of the R-, G-, and B-use liquid crystal display panels 33r, 33g, and 33b are respectively connected to individually-corresponding wire terminals 49a of the FPC 47. Such a connection among the data electrodes 23r, 23g, and 23b and the wire terminals 49a is made by a plurality of conductive wire rods 15a provided to the data electrode connection wire rod group 15, and by wire bonding, for example. To the scanning electrodes 21r, 21g, and 21b look overlaid one on the other when they are viewed in the substrate-plane normal direction of the scanning electrode substrate 9b, a drive pulse of the same voltage and waveform can be applied at the same timing. Accordingly, the scanning electrodes 21r, 21g, and 21b disposed to overlay one on the other when they are viewed in the substrate-plane normal direction of the scanning electrode substrate 9b are connected to the same wire terminal 38a in the FPC 48 by a plurality of conductive wire rods 18a in the scanning electrode connection wire rod group 18. As such, the scanning electrodes 21r, 21g, and 21b disposed to overlay one on the other when they are viewed in the substrate-plane normal direction are commonly connected. Such a connection among the scanning electrodes 21r, 21g, and 21b and the wire terminals 38a is established by wire bonding, for example.

With such wire bonding, the first side is the wire terminals 38a and 49a, and the second side is the data electrodes 23r, 23g, and 23b, and the scanning electrodes 21r, 21g, and 21b. This enables to reduce the thickness of the multi-layer liquid crystal display element 31 similarly to the first embodiment described above.

The wire terminals 49a are each so configured as to satisfy the following relational expression 9, and the wire terminals 38a are each so configured as to satisfy the following relational expression 10:

$$lp1 \leq dp/n \qquad 9$$

$$lp2 \leq sp \qquad 10$$

where lp1 denotes a terminal pitch of the wire terminals 49a, lp2 denotes a terminal pitch of the wire terminals 38a, dp denotes a wire pitch of the data electrodes, sp denotes a wire pitch of the scanning electrodes, and n denotes the number of layers of the laminated liquid crystal display panels.

Although not depicted, the multi-layer liquid crystal display element 31 is provided with, as required, a metal conductive layer formed on the data electrodes 23r, 23g, and 23b, the scanning electrodes 21r, 21g, and 21b, and the wire terminals 38a and 49a. The metal conductive layer can have the effects and functions similar to those of the metal conductive layers 12 and 14 of the first embodiment described above. As such, the multi-layer liquid crystal display element 31 can perform wire bonding with good efficiency, and also can increase the reliability of the wire bonding.

The FPCs 47 and 48 each remain electrically connected to the multi-layer liquid crystal display panel 32 by the data electrode connection wire rod group 15 and the scanning electrode connection wire group 18. There thus is no more need for the FPC 47 to be electrically connected to the data electrode substrate 11r on the underside of the data electrode substrate 11r. Similarly, the FPC 48 also has no more need to be electrically connected to the scanning electrode substrate 9b on the underside of the scanning electrode substrate 9b. Accordingly, the FPCs 47 and 48 are respectively connected to the underside of the data electrode substrate 11r and that of the scanning electrode substrate 9b via an NCF (Non-Conductive Film). As such, the multi-layer liquid crystal display element 31 of this embodiment is of a configuration different from the previous technology. That is, in the multi-layer liquid crystal display element 31, the multi-layer liquid crystal display panel 32 and the FPCs are mechanically connected on the underside of the electrode substrates, and are electrically connected by wire bonding.

The second previous technology is predicated on crimp connection of the FPCs via the ACFs, and this resultantly causes a problem of increasing the frame area having nothing to do with display. In consideration thereof, this embodiment adopts wire bonding for a connection between the multi-layer liquid crystal display panel 32 and the FPCs 47 and 48. Such wire bonding requires a width of only about a fraction of what they used to be with the ACF connection. Moreover, in the multi-layer liquid crystal display element 31, the flexible printed substrate for use with the stripe-shaped wire electrodes can be fixedly attached while utilizing the underside of the staircase-like side surface section of the multi-layer liquid crystal display panel 32, i.e., the display ineffective area. This thus enables to implement the multi-layer liquid crystal display element 31 with a narrow frame area. Moreover, according to the second embodiment, the multi-layer liquid crystal display element 31 includes one each of the data-electrode FPC and the scanning-electrode FPC, thereby leading to the same effects as those achieved in the first embodiment.

Described next is a manufacturing method for the multi-layer liquid crystal display element of this embodiment by referring to FIGS. 14A to 14C. Described below is only any difference of the manufacturing method for the multi-layer liquid crystal display element 31 in this embodiment compared with that of the multi-layer liquid crystal display element 1 in the first embodiment described above. FIGS. 14A to 14C are diagrams for illustrating the manufacturing process for the multi-layer liquid crystal display element 31 of the second embodiment.

After the completion of the manufacturing process of FIGS. 4A to 5D, as depicted in FIG. 14A, the two side surfaces of the multi-layer liquid crystal display panel 32 are each formed like a staircase. With the multi-layer liquid crystal display panel 32 cut like a staircase as such, the scanning electrodes 21r, 21g, and 21b, and the data electrodes 23r, 23g, and 23b are respectively exposed from the end portions of the electrode substrates 9r, 9g, 9b, 11r, 11g, and 11b (refer to FIG. 13). To cut the side surfaces of the multi-layer liquid crystal display panel 32 as such, any of the methods described by referring to FIGS. 5B-5D, 7, and 8 may also be applied.

Next, as depicted in FIG. 14A, the FPCs 47 and 48 are respectively fixedly crimped to, via the NCF, the underside of the electrode-formed surface of the data electrode substrate 11r, and the underside of the electrode-formed surface of the scanning electrode substrate 9b. Next, as depicted in FIGS. 14B and 14C, the data electrodes 23r, 23g, and 23b (not depicted) are connected to the wire terminals 49a (not depicted) using the conductive wire rods 15a, and the scanning electrode 21r, 21g, and 21b (not depicted) are connected to the wire terminals 38a (not depicted) using the conductive wire rods 18a (not depicted). This accordingly establishes connections between the multi-layer liquid crystal display panel 32 to the FPCs 47 and 48. Thereafter, by going through the manufacturing process similar to that in the first embodiment, the multi-layer liquid crystal display element 31 is completed.

According to the second embodiment, the number of the flexible printed substrates is reduced to two, i.e., provided on the scanning electrode side and the data electrode side), the number of the liquid-crystal drive ICs is reduced to two, and the frequency of NCF connection is also reduced to twice. As such, with the manufacturing method for the multi-layer liquid crystal display element 31 of this embodiment, the same effects as those in the first embodiment can be achieved.

Figure 15:
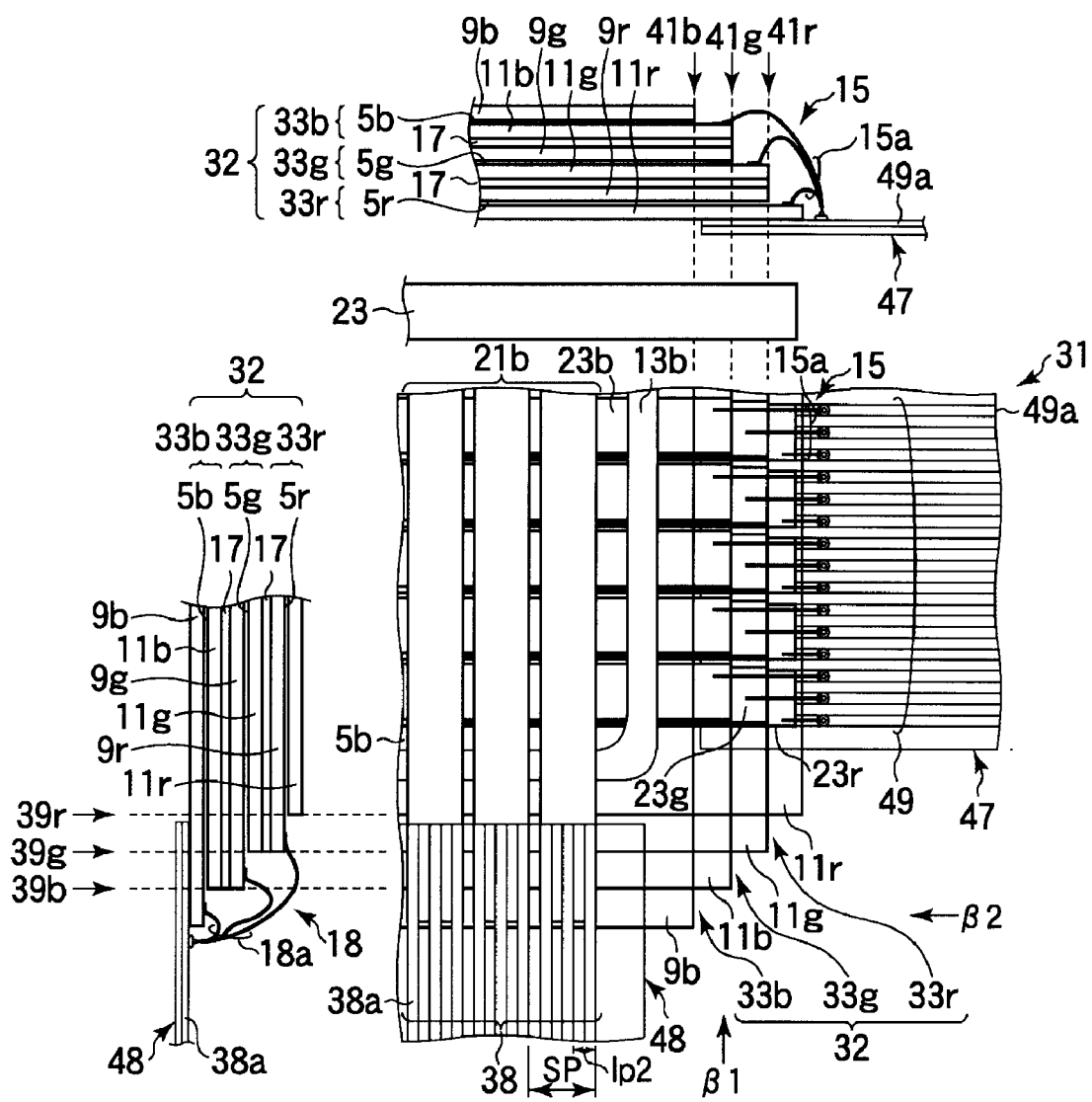
FIG. 15 is a diagram showing a corner section of the multi-layer liquid crystal display element 31 in a first modified example of the second embodiment.

By referring to FIG. 15, described next is a multi-layer display element in a first modified example of the second embodiment. The multi-layer liquid crystal display element 31 in this modified example is characterized in being a laminate of liquid crystal display panels made of the liquid crystal materials displaying various colors and varying in voltage characteristics. FIG. 15 shows an enlarged view of a corner section of the multi-layer liquid crystal display element 31 of this modified example. FIG. 15 shows, from the lower right to the upper right, in this order, the plan view of the corner section of the multi-layer liquid crystal display element 31, the plan view of the data electrode 23, and the side view of the multi-layer liquid crystal display element 31 viewed in a direction of 131 in the plan view. FIG. 15 also shows, on the side left to the plan view, the side view of the multi-layer liquid crystal display element 31 viewed in a direction of β2 in the plan view. Herein, any component similar to the multi-layer liquid crystal display element 31 of FIG. 13 in terms of functions and effects is provided with the same reference numeral, and not described twice.

When each color has its own voltage characteristics, there needs to provide a drive-pulse scanning signal varying in voltage value respectively to the R-, G-, and B-use liquid crystal display panels. In consideration thereof, as depicted in FIG. 15, the multi-layer liquid crystal display element 31 of this modified example is provided with the FPC 48 that is capable of outputting the scanning signals separately for the R-, G-, and B-use. Accordingly, the FPC 48 provided to the multi-layer liquid crystal display element 31 of this modified example is provided with the scanning signal output terminal group 38 including the wire terminals 38a which are three times numerous than those provided to the FPC 48 of FIG. 13. One scanning electrode 21b is provided with three wire terminals 38a. The scanning electrodes 21r, 21g, and 21b look overlaid when they are viewed in the substrate-plane normal direction of the scanning electrode substrate 9b are respectively connected individually to the three wire terminals 38a disposed to overlay the scanning electrode 21b.

The wire terminals 38a are each so configured as to satisfy the following relational expression:

$$lp2 \leq sp/n \quad \quad 11$$

where lp2 denotes a terminal pitch of the wire terminals 38a, sp denotes a wire pitch of the scanning electrodes, and n denotes the number of layers of the laminated liquid crystal display panels.

As described above, in the modified example, the resulting multi-layer liquid crystal display element can be provided with the liquid crystal materials varying in voltage characteristics. Moreover, the multi-layer liquid crystal display element 31 of this modified example can lead to the effects similar to those of the multi-layer liquid crystal display element 31 of FIG. 13.

Figure 16:
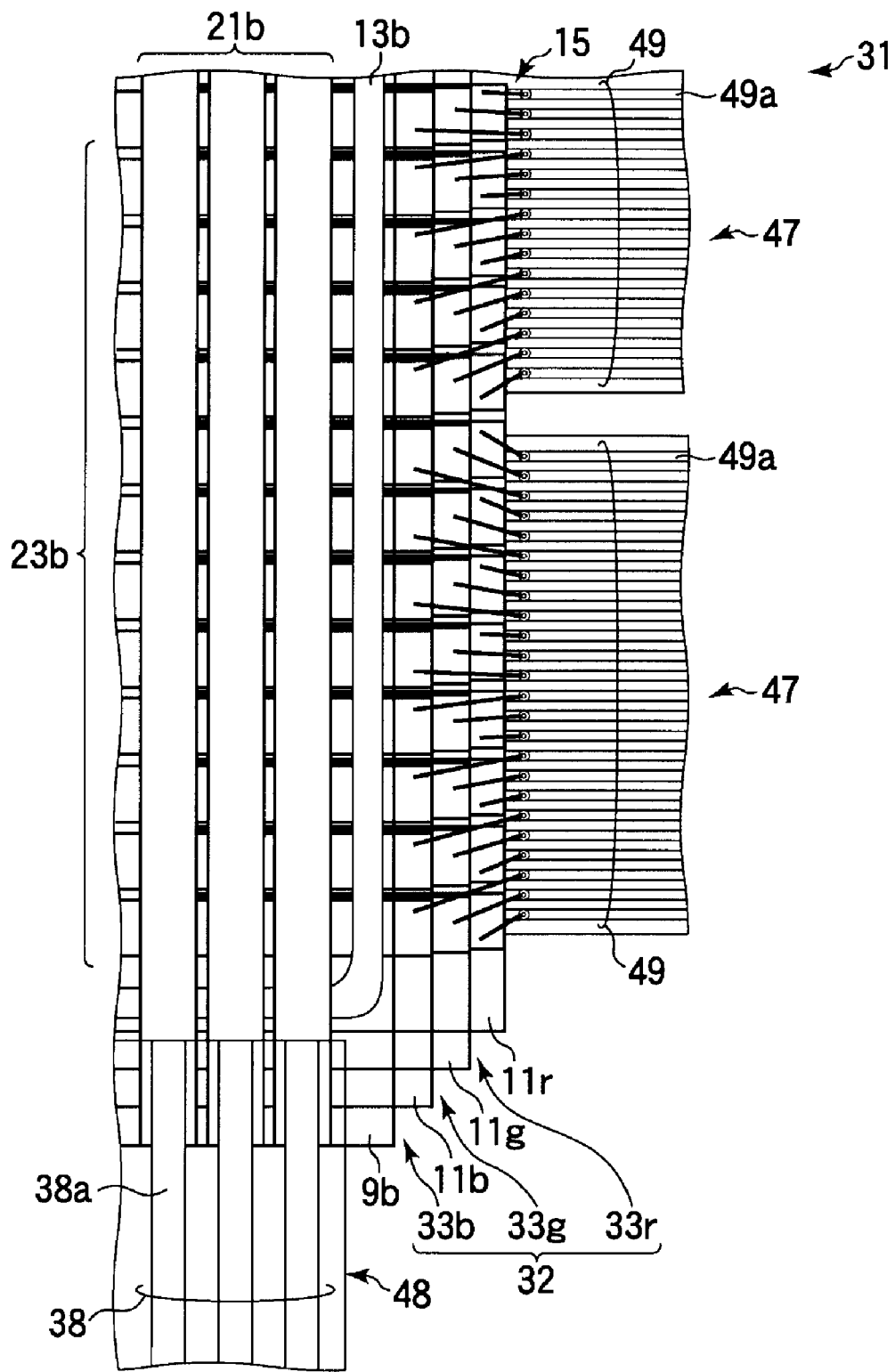
FIG. 16 is a diagram showing a corner section of the multi-layer liquid crystal display element 31 in a second modified example of the second embodiment.
Figure 17:
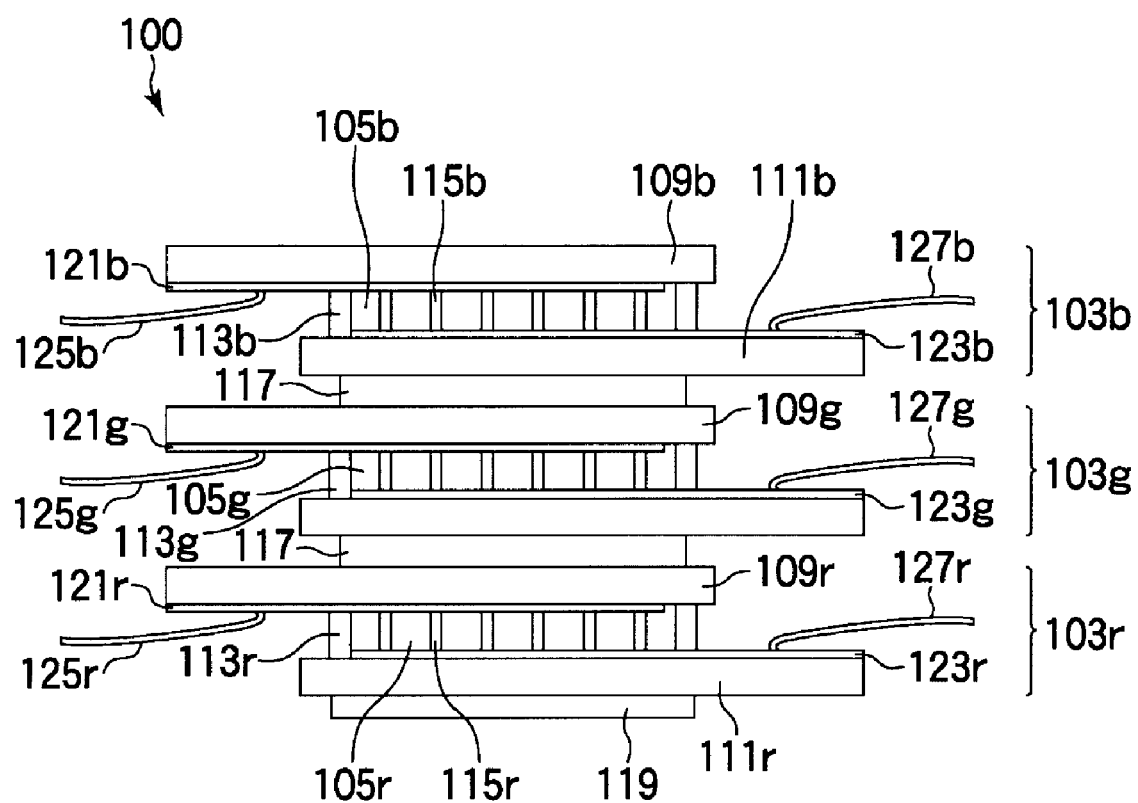
FIG. 17 is a schematic diagram showing the cross-sectional configuration of a previous liquid crystal display element 100 capable of color display using a cholesteric liquid crystal material.
Figure 20:
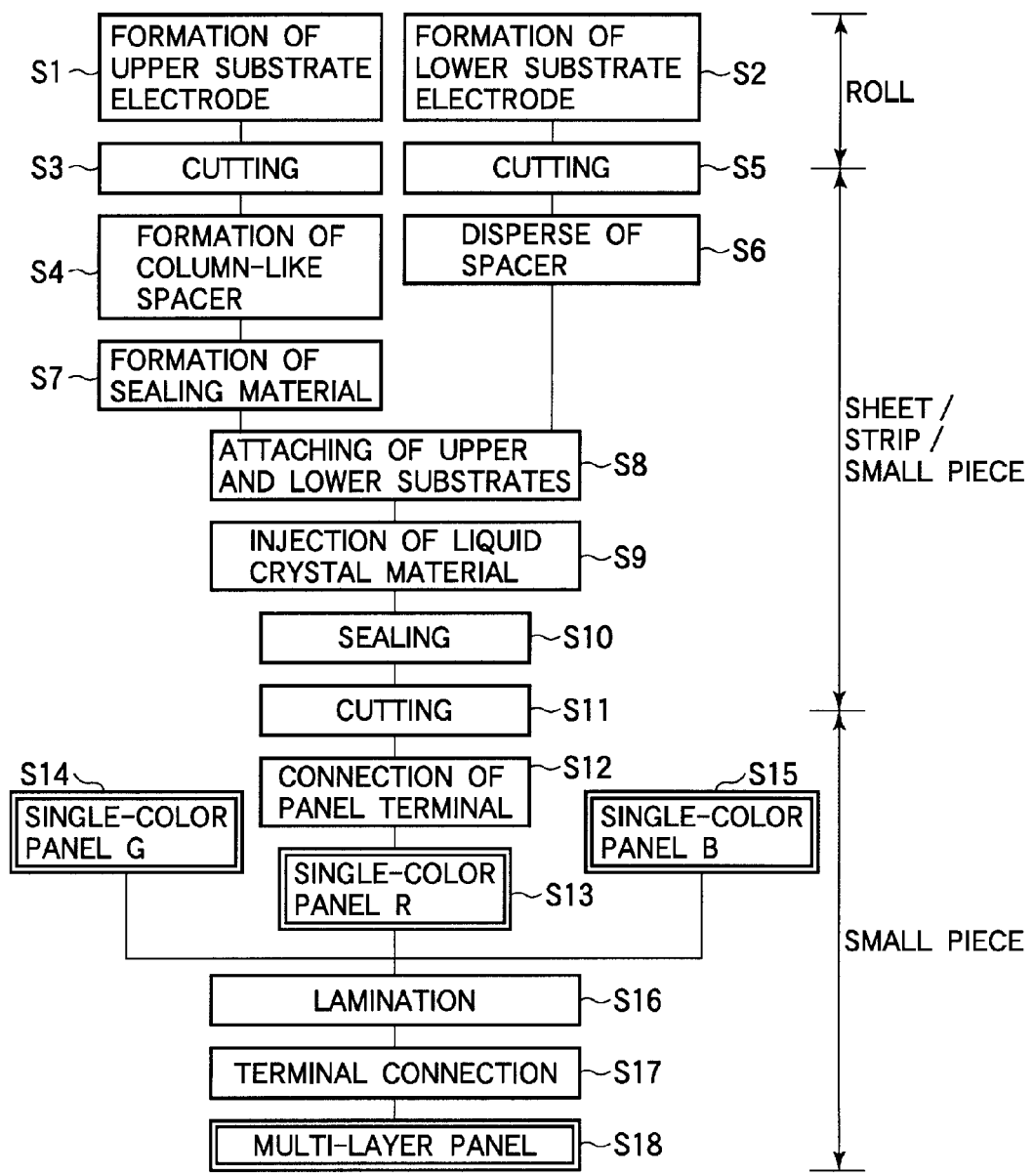
FIG. 20 is a flowchart of a manufacturing method for a previous multi-layer liquid crystal display element using a film substrate.

By referring to FIG. 16, described next is a multi-layer display element of a second modified example of the second embodiment. The multi-layer liquid crystal display element 31 of this modified example is characterized in being used to a high-definition or a large-screen liquid crystal display element. FIG. 16 is a plan view of a corner section of the multi-layer liquid crystal display element 31 of this modified example. The high-definition or large-screen liquid crystal display element includes a larger number of data and scanning electrodes. With SXGA (Super eXtended Graphics Array), for example, the number of the data electrodes is 3840 (=1280×RGB), and the number of the scanning electrodes is 1024. On the other hand, the number of data signals and scanning signals allowed for a liquid-crystal drive IC is limited depending on the chip size, and others. In consideration thereof, the liquid-crystal drive IC for outputting the data signals and the scanning signals is required to be provided plurally on both sides of the data and scanning electrodes.

In a previous liquid crystal display element, any required number of FPCs are fixedly connected by ACF-thermocompression or others in a sequential manner. The FPCs here are those formed with wiring patterns as many as the outputs of the liquid-crystal IC. In this case, if there is not an appropriate space between one FPC and another adjacent thereto, at the time of thermocompression for the FPCs, not only the FPC that is originally supposed to be crimped but also a part of the FPC adjacent thereto are crimped. As a result, the FPC has any area pressed twice by the crimping head, thereby reducing the reliability of the FPC-electrical connection. With such a space adequately provided between the FPCs, in the previous liquid crystal display element, there needs to reduce the terminal pitch of the connection terminal section for FPC crimping compared with the electrode pitch of the data and scanning electrodes, and to form an electrode pattern specifically in the unit of a liquid-crystal drive IC.

As depicted in FIG. 16, the multi-layer liquid crystal display element 31 is provided with a plurality of FPCs 47 and a plurality of FPCs 48 (FIG. 16 shows only one). In this modified example, the multi-layer liquid crystal display panel 32 is electrically connected to the FPCs 47 and 48 by the data electrode connection wire group 15 and the scanning electrode connection wire group (not depicted). As such, there only needs to mechanically fix the FPCs 47 and 48 to the underside of the data electrode substrate 11r and that of the scanning electrode substrate 9b by thermocompression using an NCF, for example. This accordingly eliminates, in the multi-layer liquid crystal display panel 32, the need to form an electrode pattern specifically in the unit of a liquid-crystal drive IC to the electrode substrates 9r, 9g, 9b, 11r, 11g, and 11b. What is more, the data signal output terminal group 49 is reduced in width by reducing the wire pitch of the wire terminals 49a and 38a of the FPCs 47 and 48, thereby being able to protect the FPCs from being pressed twice by the thermocompression head.

As described in the foregoing, according to the modified example, the multi-layer liquid crystal display element 31 favorably prevents the FPCs 47 and 48 from being pressed twice with no need for forming an electrode pattern specifically in the unit of a liquid-crystal drive IC, thereby being able to successfully increase the reliability of electrical connection of the FPCs 47 and 48. What is more, the multi-layer liquid crystal display element 31 requires no diagonal wiring for forming the electrode pattern specifically in the unit of a liquid-crystal drive IC as such, thereby favorably reducing the frame width.

In the present invention, the foregoing description is surely not restrictive, and it is understood that numerous other modifications and variations can be devised.

In the first and second embodiments described above, the multi-layer liquid crystal display elements 1 and 31 are respectively provided with the FPCs 27, 28, 47, and 48. This is surely not restrictive, and similar effects can be achieved when the multi-layer liquid crystal display elements 1 and 31 are respectively provided with a COF (Chip On Film) as an alternative to such FPCs.

Moreover, in the first and second embodiments described above, exemplified is the liquid crystal display element. This is surely not restrictive, and any display element will be also applicable to various display modes, i.e., an electrophoresis mode, a twist-ball mode, and an organic EL mode, as long as the display element is of a multi-layer configuration.

Furthermore, in the embodiments described above, exemplified is the passive-matrix-type liquid crystal display element using the cholesteric liquid crystal material. This is surely not restrictive, and the embodiment is surely applicable to an active-matrix-type display element.

The present embodiment is applicable to interlayer wiring between a plurality of display elements laminated together.

What is claimed is:

1. A multi-layer display element, comprising:
    a first display panel including:
        a first data electrode substrate formed with a first data electrode; and
        a first scanning electrode substrate formed with a first scanning electrode disposed to intersect with the first data electrode, and is disposed to oppose the first data electrode substrate so as to expose an end portion of the first data electrode and an end portion of the first scanning electrode;
    a second display panel laminated to the first display panel, including:
        a second data electrode substrate formed with a second data electrode; and
        a second scanning electrode substrate formed with a second scanning electrode disposed to intersect with the second data electrode, and is disposed to oppose the second data electrode substrate so as to expose an end portion of the second data electrode and an end portion of the second scanning electrode;
    a data signal output terminal group that provides a data signal for driving the first and second data electrodes;
    a scanning signal output terminal group that provides a scanning signal for driving the first and second scanning electrodes;
    a data electrode connection wire rod group including a plurality of conductive wire rods for connecting together the first and second data electrodes and the data signal output terminal group; and a scanning electrode connection wire rod group including a plurality of conductive wire rods for connecting together the first and second scanning electrodes and the scanning signal output terminal group.

2. The multi-layer display element according to claim 1, wherein
the data signal output terminal group includes a plurality of first standoff terminals disposed in the vicinity of the end portion of the first data electrode, and each from which the data signal is provided.

3. The multi-layer display element according to claim 2, wherein
the data signal output terminal group includes a first pull-out terminal that is extracted and pulled from the end portion of the first data electrode, and is disposed in parallel to the first standoff terminals.

4. The multi-layer display element according to claim 1, wherein
the scanning signal output terminal group includes a plurality of second standoff terminals disposed in the vicinity of the end portion of the second scanning electrode, and each from which the scanning signal is provided.

5. The multi-layer display element according to claim 4, wherein
the scanning signal output terminal group includes a second pull-out terminal that is extracted and pulled from the end portion of the second scanning electrode, and is disposed in parallel to the second standoff terminals.

6. The multi-layer display element according to claim 1, further comprising:
a data signal drive circuit substrate including the data signal output terminal group connected to the first data electrode of the first data electrode substrate; and
a scanning signal drive circuit substrate including the scanning signal output terminal group connected to the second scanning electrode of the second scanning electrode substrate.

7. The multi-layer display element according to claim 6, wherein
the data signal output terminal group includes a plurality of first wire terminals formed in a stripe shape.

8. The multi-layer display element according to claim 7, wherein
the scanning signal output terminal group includes a plurality of second wire terminals formed in a stripe shape.

9. The multi-layer display element according to claim 1, further comprising:
a third display panel that is laminated between the first and second panels, and includes:
a third data electrode substrate formed with a third data electrode; and
a third scanning electrode substrate formed with a third scanning electrode disposed to intersect with the third data electrode, and is disposed to oppose the third data electrode substrate so as to expose an end portion of the third data electrode and an end portion of the third scanning electrode.

10. The multi-layer display element according to claim 9, wherein
the data electrode connection wire rod group further includes a plurality of conductive wire rods for connecting together the third data electrode and the data signal output terminal group, and
the scanning electrode connection wire rod group further includes a plurality of conductive wire rods for connecting together the third scanning electrode and the scanning signal output terminal group.

11. The multi-layer display element according to claim 9, wherein
the first to third scanning electrodes disposed to overlay one on the other when they are viewed in a substrate-plane normal direction of the second scanning electrode substrate are commonly connected.

12. The multi-layer display element according to claim 9, wherein
the first to third data electrode substrates and the first to third scanning electrode substrates are all made flexible.

13. The multi-layer display element according to claim 9, wherein
the first to third display panels are respectively provided with liquid crystal layers that indicate a reflection state for light reflection, a light-transmission state for light transmission, or an intermediate state between the reflection state and the light-transmission state for reflecting lights of different colors.

14. The multi-layer display element according to claim 9, wherein
the first to third data electrodes are each connected to the data signal output terminal group by wire bonding, and
the first to third scanning electrodes are each connected to the scanning signal output terminal group by wire bonding.

15. The multi-layer display element according to claim 14, wherein
with the wire bonding, the first to third data electrodes and the first to third scanning electrodes are on a second side.

16. The multi-layer display element according to claim 14, wherein
the data signal output terminal group and the scanning signal output terminal group are each provided with a metal conductive layer formed onto at least either the first and second standoff terminals or the first and second pull-out terminals.

17. The multi-layer display element according to claim 14, wherein
the data signal output terminal group and the scanning signal output terminal group are each provided with a metal conductive layer formed to at least either the first or second wire terminal.

18. A multi-layer display element manufacturing method, comprising:
manufacturing a plurality of display panels each including:
a data electrode substrate including a stripe-shaped data electrode, and a data signal output terminal group disposed in the vicinity of an end portion of the data electrode;
a scanning electrode substrate including a stripe-shaped scanning electrode and a scanning signal output terminal group disposed in the vicinity of an end portion of the scanning electrode, and being attached to the data electrode substrate on their electrode-formed surfaces to intersect the data electrode with the scanning electrode; and
a display material layer sealed between the data electrode substrate and the scanning electrode substrate,
laminating together the plurality of display panels with the scanning electrode substrate being opposed to the data electrode substrate;
cutting away, to expose the data signal output terminal group of any of the data electrode substrate and others located on an outermost side, and the end portion of the data electrode of the remaining data electrode substrate, an end portion of the remaining data electrode substrate and an end portion of the scanning electrode substrate;

cutting away, to expose the scanning signal output terminal group of any of the scanning electrode substrate and others located on an outermost side, and the end portion of the scanning electrode of the remaining scanning electrode substrate, an end portion different from the end portion of the remaining scanning electrode substrate and an end portion of the data electrode substrate;

connecting, using a conductive wire rod, an exposed portion of the data electrode of the remaining data electrode substrate and the data signal output terminal group of the data electrode substrate located on the outermost side; and connecting, using another conductive wire rod, an exposed portion of the scanning electrode of the remaining scanning electrode substrate and the scanning signal output terminal group of the scanning electrode substrate located on the outermost side.

19. A multi-layer display element manufacturing method, comprising:

manufacturing a plurality of display panels each including:

a data electrode substrate including a stripe-shaped data electrode;

a scanning electrode substrate including a stripe-shaped scanning electrode, and being attached to the data electrode substrate on their electrode-formed surfaces to intersect the data electrode with the scanning electrode; and a display material layer sealed between the data electrode substrate and the scanning electrode substrate, laminating together the plurality of display panels with the scanning electrode substrate being opposed to the data electrode substrate;

cutting away, to expose an end portion of the data electrode of each of the data electrode substrate and others, an end portion of any of the data electrode substrates other than the data electrode substrate located on an outermost side, and an end portion of each of the scanning electrode substrate and others;

cutting away, to expose an end portion of the scanning electrode of each of the scanning electrode substrate and others, an end portion of any of the scanning electrode substrates other than the scanning electrode substrate located on the outermost side, and an end portion different from the end portion of each of the data electrode substrates;

connecting, on an underside of the data electrode-formed surface of the data electrode substrate located on the outermost side, a data electrode drive circuit substrate including a data signal output terminal group;

connecting, on an underside of the scanning electrode-formed surface of the scanning electrode substrate located on the outermost side, a scanning electrode drive circuit substrate including a scanning signal output terminal group;

connecting, using a conductive wire rod, an exposed portion of the data electrode of each of the data electrode substrates and the data signal output terminal group; and connecting, using another conductive wire rod, an exposed portion of the scanning electrode of each of the scanning electrode substrates and the scanning signal output terminal group.

20. The multi-layer display element manufacturing method according to claim 18, wherein the end portion of the data electrode substrate located on the outermost side and the end portion of the scanning electrode substrate located on the outermost side are cut respectively, and the end portion of each pair of the data electrode substrate and the scanning electrode substrate laminated face-to-face each other is cut at the same time.

* * * * *